(12) United States Patent
Smrha

(10) Patent No.: US 8,474,742 B2
(45) Date of Patent: Jul. 2, 2013

(54) SPOOL FOR TELECOMMUNICATIONS CABLE AND METHOD

(75) Inventor: Mark Smrha, Burnsville, MN (US)

(73) Assignee: ADC Telecommunications, Inc., Berwyn, PA (US)

( * ) Notice: Subject to any disclaimer, the term of this patent is extended or adjusted under 35 U.S.C. 154(b) by 351 days.

(21) Appl. No.: 12/512,666

(22) Filed: Jul. 30, 2009

(65) Prior Publication Data

US 2011/0024543 A1 Feb. 3, 2011

(51) Int. Cl.
*B65H 75/38* (2006.01)

(52) U.S. Cl.
USPC .................. 242/378; 242/378.3; 242/378.4; 191/12.2 R

(58) Field of Classification Search
USPC 242/378, 378.1–378.4, 603, 379; 119/12.2 R
See application file for complete search history.

(56) References Cited

U.S. PATENT DOCUMENTS

| | | | |
|---|---|---|---|
| 1,137,133 | A | 4/1915 | Hamelback |
| 1,276,825 | A | 8/1918 | Swope |
| 2,206,352 | A | 7/1940 | Hellmann |
| 2,605,060 | A | 7/1952 | Bell |
| 2,874,918 | A | 2/1959 | Steiber |
| 2,905,409 | A | 9/1959 | Sheldon |
| 3,120,355 | A | 2/1964 | Bowman |
| 3,632,061 | A | 1/1972 | Roseboom |
| 3,822,834 | A | 7/1974 | Fjarlie |
| 3,831,879 | A | 8/1974 | Miller et al. |
| 4,008,791 | A | 2/1977 | Shafii-Kahany et al. |
| 4,055,314 | A | 10/1977 | Kovaleski |
| 4,111,380 | A | 9/1978 | Heuckroth |
| 4,186,897 | A | 2/1980 | Brown |
| 4,222,535 | A | 9/1980 | Hosbein |
| 4,282,954 | A | 8/1981 | Hill |
| 4,565,333 | A | 1/1986 | Meneian |
| 4,978,191 | A | 12/1990 | Hasegawa et al. |
| 5,022,600 | A | 6/1991 | Blanc et al. |
| 5,058,259 | A | 10/1991 | Araki et al. |

(Continued)

FOREIGN PATENT DOCUMENTS

| | | |
|---|---|---|
| JP | 2-296201 | 12/1990 |
| JP | 5-303018 | 11/1993 |

(Continued)

OTHER PUBLICATIONS

U.S. Appl. No. 13/025,779, filed Feb. 11, 2011 entitled "Spool for Telecommunications Cable and Method".

(Continued)

*Primary Examiner* — Sang Kim
(74) *Attorney, Agent, or Firm* — Merchant & Gould P.C.

(57) ABSTRACT

A spool for a telecommunications cable. The spool winds-up and pays-out the cable without accumulating twist in the cable. The spool can also pay out a distal end of the cable and mount a proximal end of the cable. Because no twist is accumulated in the cable, the first end and/or the second end of the cable can remain connected while the spool is winding-up or paying-out. The spool includes a base, a cable wrap reverser, and a hub. The spool is adapted to wrap the cable about the base in a first wrapping direction and is adapted to wrap the cable about the hub in an opposite second wrapping direction. The cable wrap reverser is adapted to transition and guide the cable from the first to the second wrapping direction.

30 Claims, 21 Drawing Sheets

U.S. PATENT DOCUMENTS

| | | | |
|---|---|---|---|
| 5,069,523 A | 12/1991 | Finzel et al. | |
| 5,078,466 A | 1/1992 | MacCulloch | |
| 5,098,028 A | 3/1992 | Ida et al. | |
| 5,165,543 A | 11/1992 | Heyda et al. | |
| 5,268,986 A | 12/1993 | Kakii et al. | |
| 5,277,314 A | 1/1994 | Cooper et al. | |
| 5,332,171 A | 7/1994 | Steff | |
| 5,335,874 A | 8/1994 | Shrum et al. | |
| 5,450,509 A | 9/1995 | Davis | |
| 5,481,607 A | 1/1996 | Hsiao | |
| 5,494,446 A | 2/1996 | DeLucia et al. | |
| 5,544,836 A * | 8/1996 | Pera | 242/372 |
| 5,607,316 A | 3/1997 | Ishikawa | |
| 5,669,571 A * | 9/1997 | Graybill | 242/378.1 |
| 5,679,015 A | 10/1997 | Schauer | |
| 5,758,834 A | 6/1998 | Dragoo et al. | |
| 5,797,558 A | 8/1998 | Peterson et al. | |
| 5,913,487 A | 6/1999 | Leatherman | |
| 5,915,062 A | 6/1999 | Jackson et al. | |
| 5,921,497 A | 7/1999 | Utley, Jr. | |
| 5,993,229 A | 11/1999 | Tanaka et al. | |
| 5,996,930 A | 12/1999 | Katayama et al. | |
| 6,077,108 A | 6/2000 | Lorscheider et al. | |
| 6,215,938 B1 | 4/2001 | Reitmeier et al. | |
| 6,220,413 B1 | 4/2001 | Walters et al. | |
| 6,250,578 B1 * | 6/2001 | Manda | 242/378.1 |
| 6,260,781 B1 | 7/2001 | Cooper | |
| 6,305,958 B1 | 10/2001 | Maegawa et al. | |
| 6,325,665 B1 | 12/2001 | Chung | |
| 6,328,243 B1 | 12/2001 | Yamamoto | |
| 6,349,893 B1 | 2/2002 | Daoud | |
| 6,361,237 B1 | 3/2002 | Salmela | |
| 6,375,109 B1 | 4/2002 | Liao | |
| 6,405,961 B1 * | 6/2002 | Mastrangelo | 242/378.1 |
| 6,433,274 B1 | 8/2002 | Doss et al. | |
| 6,484,958 B1 | 11/2002 | Xue et al. | |
| 6,522,826 B2 | 2/2003 | Gregory | |
| 6,572,393 B2 | 6/2003 | Kawamura | |
| RE38,211 E | 8/2003 | Peterson et al. | |
| 6,616,080 B1 | 9/2003 | Edwards et al. | |
| 6,643,443 B2 | 11/2003 | Holman et al. | |
| 6,643,445 B2 | 11/2003 | Bumgarner et al. | |
| 6,744,954 B1 | 6/2004 | Tanaka et al. | |
| 6,795,633 B2 | 9/2004 | Joseph, II | |
| 6,819,848 B2 | 11/2004 | Takahashi | |
| 6,856,748 B1 | 2/2005 | Elkins, II et al. | |
| 6,915,058 B2 | 7/2005 | Pons | |
| 7,017,846 B2 | 3/2006 | Tsoi et al. | |
| 7,036,761 B2 | 5/2006 | Washington et al. | |
| 7,086,512 B2 | 8/2006 | Shack et al. | |
| 7,104,491 B2 | 9/2006 | Vinding | |
| 7,116,883 B2 | 10/2006 | Kline et al. | |
| 7,120,349 B2 | 10/2006 | Elliott | |
| 7,182,286 B2 | 2/2007 | Huang | |
| 7,266,283 B2 | 9/2007 | Kline et al. | |
| 7,315,681 B2 | 1/2008 | Kewitsch | |
| 7,357,666 B2 | 4/2008 | Wu | |
| 7,369,739 B2 | 5/2008 | Kline et al. | |
| 7,460,753 B2 | 12/2008 | Kewitsch | |
| 7,548,679 B2 | 6/2009 | Hirano et al. | |
| 7,599,598 B2 | 10/2009 | Gniadek et al. | |
| 7,627,218 B2 | 12/2009 | Hurley | |
| 7,680,386 B2 | 3/2010 | Hurley | |
| 2002/0122643 A1 | 9/2002 | Bueschelberger et al. | |
| 2003/0059192 A1 | 3/2003 | Johnson | |
| 2003/0095773 A1 | 5/2003 | Ichinari et al. | |
| 2004/0211851 A1 | 10/2004 | Barton et al. | |
| 2006/0045458 A1 | 3/2006 | Sasaki et al. | |
| 2006/0264921 A1 | 11/2006 | Deutsch et al. | |
| 2007/0196053 A1 | 8/2007 | Kewitsch | |
| 2008/0019642 A1 | 1/2008 | Kewitsch | |
| 2008/0273844 A1 | 11/2008 | Kewitsch | |
| 2008/0292261 A1 | 11/2008 | Kowalczyk et al. | |
| 2009/0060441 A1 | 3/2009 | Kowalczyk et al. | |
| 2009/0074370 A1 | 3/2009 | Kowalczyk et al. | |
| 2009/0097797 A1 | 4/2009 | Kewitsch | |
| 2010/0329621 A1 | 12/2010 | Makrides-Saravanos et al. | |
| 2011/0024544 A1 | 2/2011 | Smrha et al. | |

FOREIGN PATENT DOCUMENTS

| | | |
|---|---|---|
| JP | 2000-284129 | 10/2000 |
| JP | 2003-29059 | 1/2003 |
| JP | 2003-329850 | 11/2003 |
| JP | 2003-329851 | 11/2003 |
| WO | WO 2006/015343 A2 | 2/2006 |
| WO | WO 2006/078007 A1 | 7/2006 |

OTHER PUBLICATIONS

Telescent Catalog Fiber Optic Connectivity, pp. 1-39 (Copyright 2007).

Decoiler Devices/Traverse Arms/Accessories, http://replay.web.archive.org/20060518044402/https://weldingsupply.securesites.com/, 4 pages (May 18, 2006).

Decoiler Devices/Traverse Arms/Accessories, https://weldingsupply.securesites.com/yeoweld-fax.html, 5 pages (Date Printed May 2, 2011).

Fiberlaunch, 4 pages (Copyright 2010).

* cited by examiner

SPOOL FOR TELECOMMUNICATIONS CABLE AND METHOD

BACKGROUND

Spools or reels can be used to store telecommunications cable (e.g., electrical cable and/or fiber optic cable). The spools include a hub or a drum about which the cable is wound. The hub of the spools is often cylindrical, and the cable is often wrapped around the cylindrical hub in a predominantly circumferential manner. By winding up the cable on the spool, the cable can be compactly stored and transported, protected from tangling and kinking, and kept ready for easy deployment.

SUMMARY

Features of the present disclosure relate to a spool for a telecommunications cable. The spool includes a base, a cable wrap reverser, and a hub. The base includes a spool mount and a first cable wrapping area and defines a rotation axis. The cable wrap reverser includes a cable guide and is rotatably mounted about the rotation axis of the base. The hub includes a second cable wrapping area and is rotatably mounted about the rotation axis of the base.

The base of the spool is adapted to hold a first end of the telecommunications cable, and the spool is adapted to payout the telecommunications cable from the spool when a second end of the telecommunications cable, adjacent the second cable wrapping area, is pulled away from the spool.

The spool is adapted to wrap the telecommunication cable adjacent the first end about the first cable wrapping area of the base in a first wrapping direction and is adapted to wrap the telecommunication cable about the second cable wrapping area of the hub in a second wrapping direction. The first and the second wrapping directions are generally opposite from each other. The cable wrap reverser is adapted to transition and guide the telecommunications cable from wrapping in the first wrapping direction on the first cable wrapping area to wrapping in the second wrapping direction on the second cable wrapping area.

The spool of the present disclosure is able to wind-up and pay-out the telecommunications cable without causing the accumulation of twist in the cable. The spool can also pay out the second end of the telecommunication cable and mount the first end of the telecommunication cable. Because no twist is accumulated in the telecommunication cable, the first end and/or the second end of the telecommunication cable can remain connected while the spool is winding-up or paying-out.

These and other features and advantages will be apparent from a reading of the following detailed description and a review of the associated drawings. It is to be understood that both the forgoing general description and the following detailed description are explanatory only and are not restrictive of the broad aspects of the disclosure.

DETAILED DESCRIPTION

Figure 1:
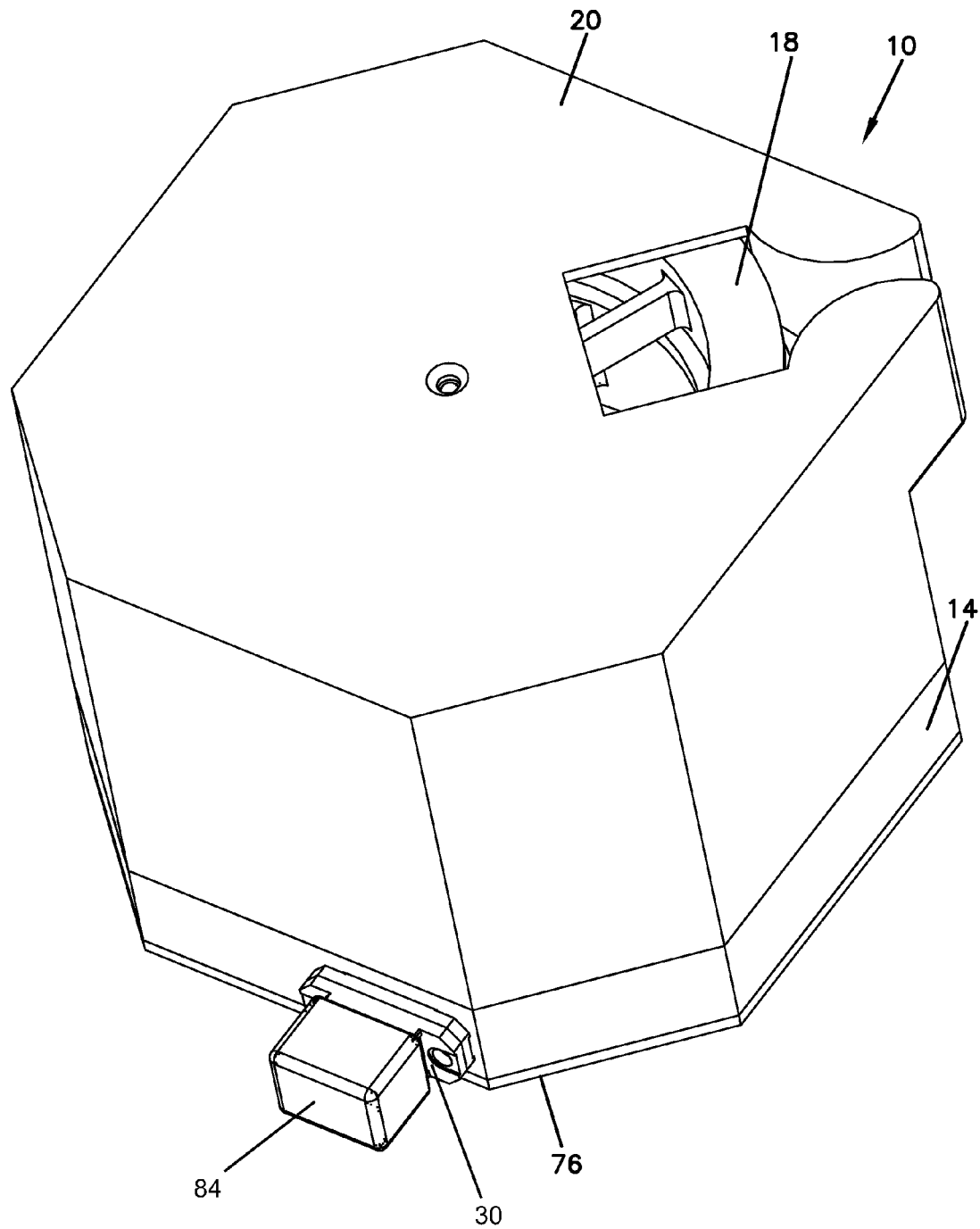
FIG. 1 is a perspective view of a spool for a telecommunications cable in accordance with the principles of the present disclosure.
Figure 2:
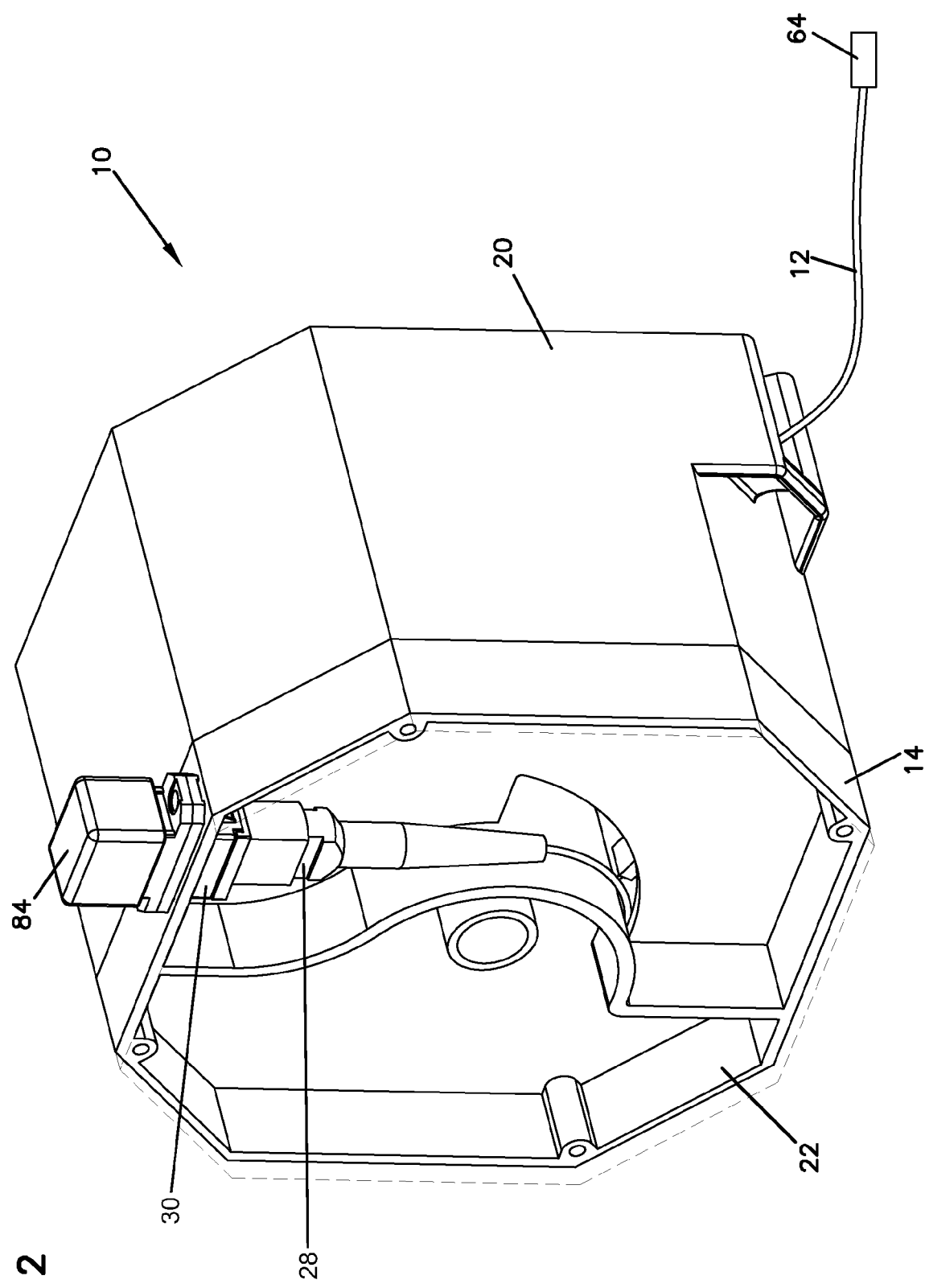
FIG. 2 is another perspective view of the spool of FIG. 1 with an access cover shown transparently in phantom line.

It is often desirable to deploy a telecommunications cable with a length of the telecommunications cable varying for various purposes. For example, it may be desired to connect the telecommunications cable to various ports that vary in location and/or distance from each other. It is often desirable to retract a telecommunications cable when the telecommunications cable is not connected and thereby keep the telecommunications cable from cluttering a cabinet and/or a work area, etc.

FIGS. 1-8 illustrate a spool 10 for a telecommunications cable 12 in accordance with the principles of the present disclosure. The spool 10 includes a base 14, a cable wrap reverser 16, a hub 18, a cover 20, and an access cover 76.

The spool 10 allows for one end of the telecommunications cable 12 to be unwrapped from a spooled area of cable while the opposite end of the telecommunications cable 12 remains stationary, without causing twists in the telecommunications cable 12.

Figure 9:
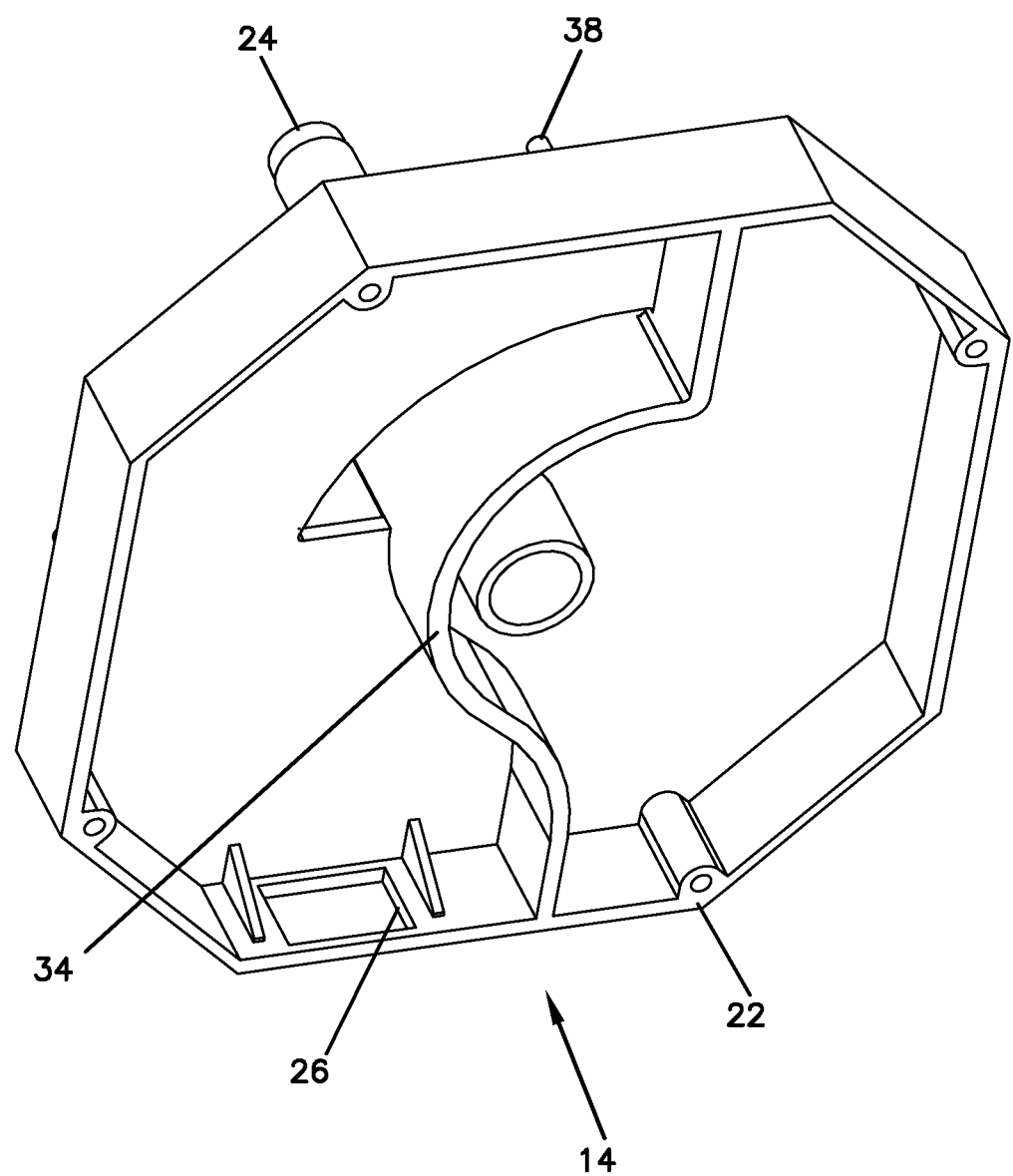
FIG. 9 is a perspective view of a base of the spool of FIG. 1.
Figure 10:
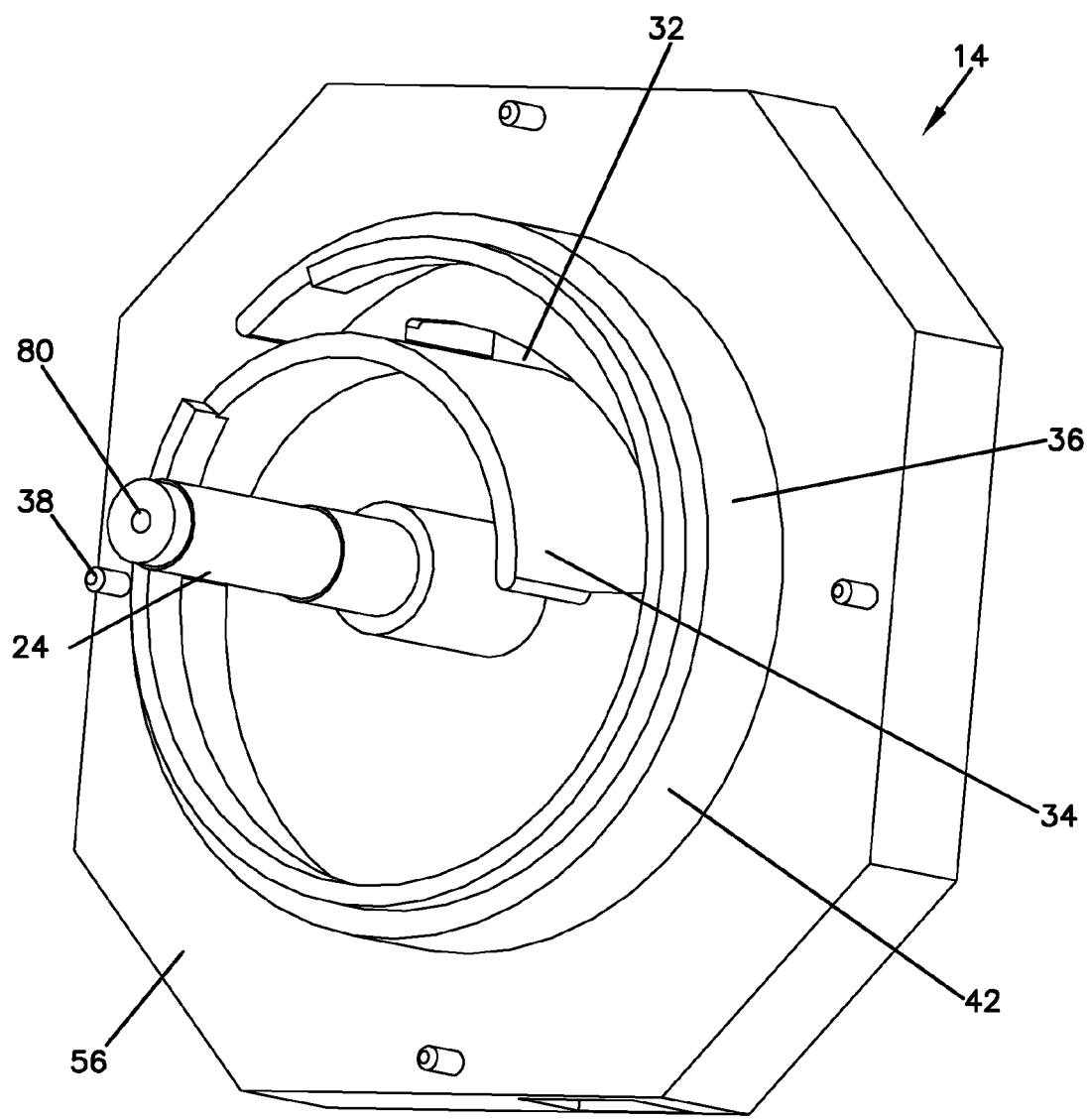
FIG. 10 is another perspective view of the base of FIG. 9.
Figure 11:
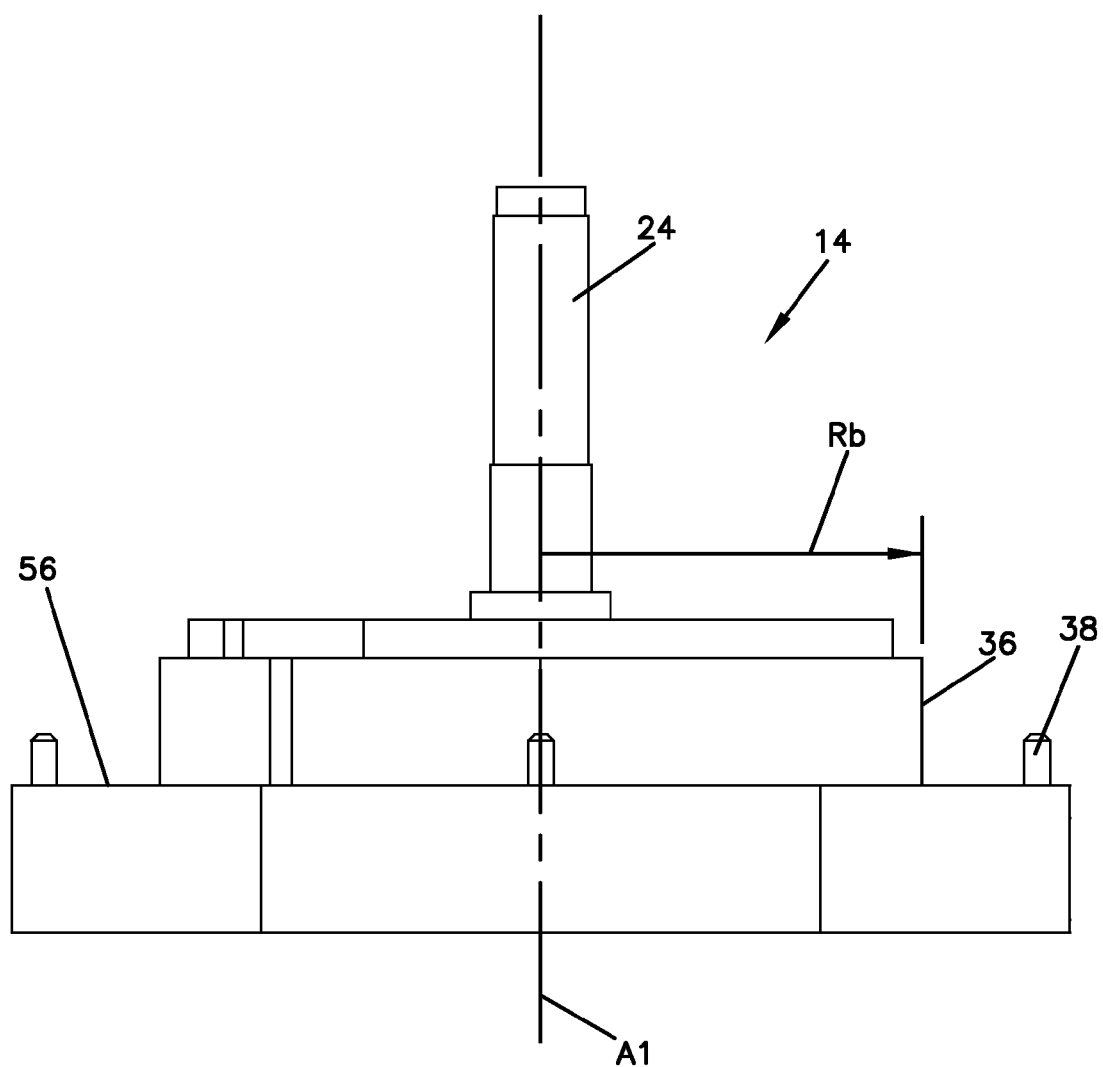
FIG. 11 is a plan view of the base of FIG. 9.
Figure 16:
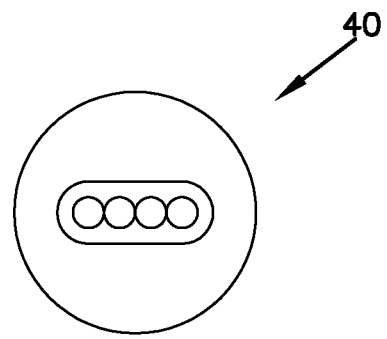
FIG. 16 is a cross sectional view of a fiber optic cable telecommunications cable.

As depicted, the base 14 of the spool 10 is adapted for stationary mounting and includes a bulkhead 22 to mount the spool 10. The base 14 includes an axle 24 and thereby defines an axis A1 (see FIGS. 9-11). The base 14 can include a connector mount 26 (see FIG. 9) for mounting a connector 28 that terminates the telecommunications cable 12 (see FIG. 5). The connector mount 26 can mount an adapter 30 that, in turn, can connect with the connector 28. A cap 84 can cover the adapter 30. The base 14 can include a slot 32 to allow passage of the telecommunications cable 12 through the base 14. The base 14 can include cable guide features 34 to guide the telecommunications cable 12 between a cable wrapping area 36 and the connector mount 26 or other feature. In applications where the telecommunications cable 12 is a fiber optic cable 40 (see FIG. 16), the cable guide features 34 are adapted to prevent the fiber optic cable 40 from bending sharply (e.g., bending that would cause an optical fiber within the fiber optic cable 40 to be bent sharper than a minimum bend radius Rmin. The base 14 can include cover retainers 38 to retain and mount the cover 20 on the base 14. As depicted, the base 14 can mount the cover 20 in multiple orientations. In particular, the base 14 can mount the cover 20 in four different orientations. The cable wrapping area 36 can be a predominantly cylindrical surface 42 with a radius of Rb (see FIG. 11). In applications where the telecommunications cable 12 is the fiber optic cable 40, the radius Rb can be greater than the minimum bend radius Rmin. The base 14 can include a flange 56 (see FIG. 10) adjacent the cable wrapping area 36.

Figure 12:
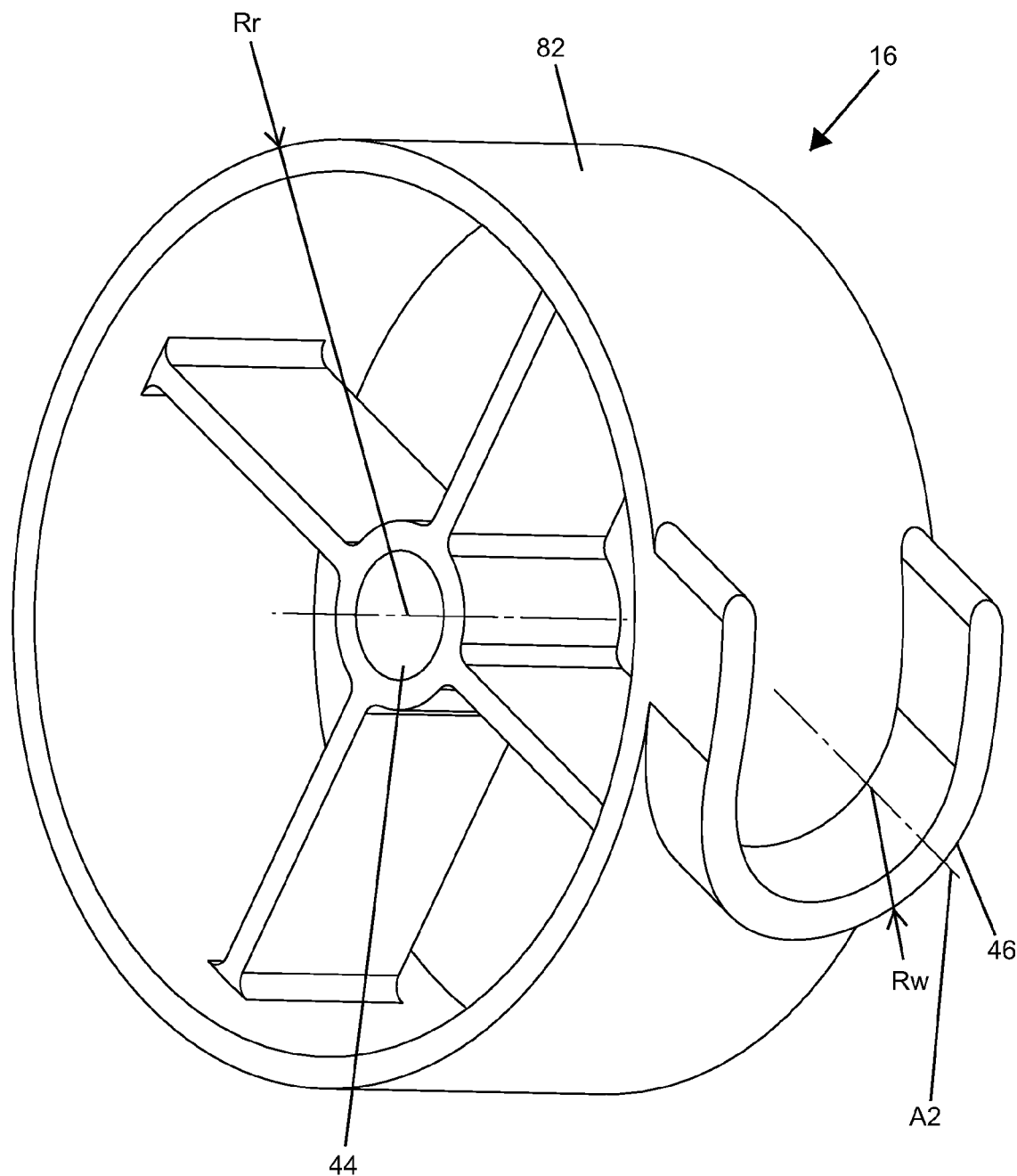
FIG. 12 is a perspective view of a cable wrap reverser of the spool of FIG. 1.
Figure 18:
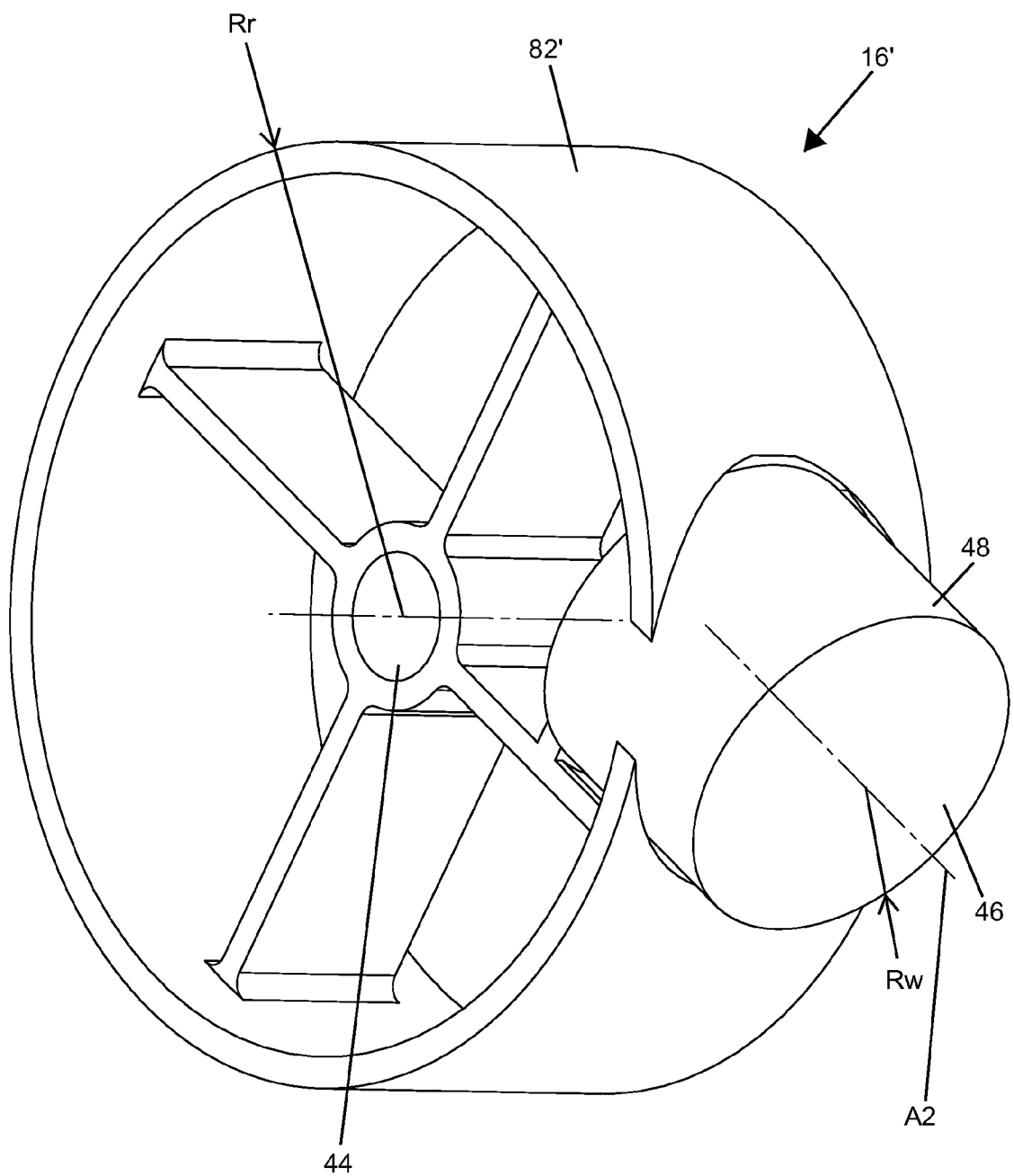
FIG. 18 is a perspective view of an alternate cable wrap reverser including a pulley.

The base 14 rotatably mounts the cable wrap reverser 16 about the axis A1. The cable wrap reverser 16 can include bearings 44 (see FIG. 12) adapted to mount on the axle 24 of the base 14. The cable wrap reverser 16 includes a cable guide 46 that can define a radius Rw. In applications where the telecommunications cable 12 is the fiber optic cable 40, the radius Rw can be greater than the minimum bend radius Rmin. As depicted at FIG. 12, the cable guide 46 includes a U-shaped configuration. In other embodiments, the cable guide 46 can be a pulley 48. FIG. 18 illustrates an alternate cable wrap reverser 16' including the pulley 48 as the cable guide 46. The cable guide 46 defines an axis A2. As depicted, the axis A2 is generally perpendicular to the axis A1 when the spool 10 is assembled. The axis A2 may intersect the axis A1 or may be offset from the axis A1 when the spool 10 is assembled. As depicted, the cable wrap reverser 16 includes a generally cylindrical surface 82, and the cable wrap reverser 16' includes a generally cylindrical surface 82'. The cylindrical surface 82, 82' is depicted as being centered about the axis A1 when the spool 10 is assembled. The cylindrical surface 82, 82' is depicted as defining a radius Rr.

Figure 13:
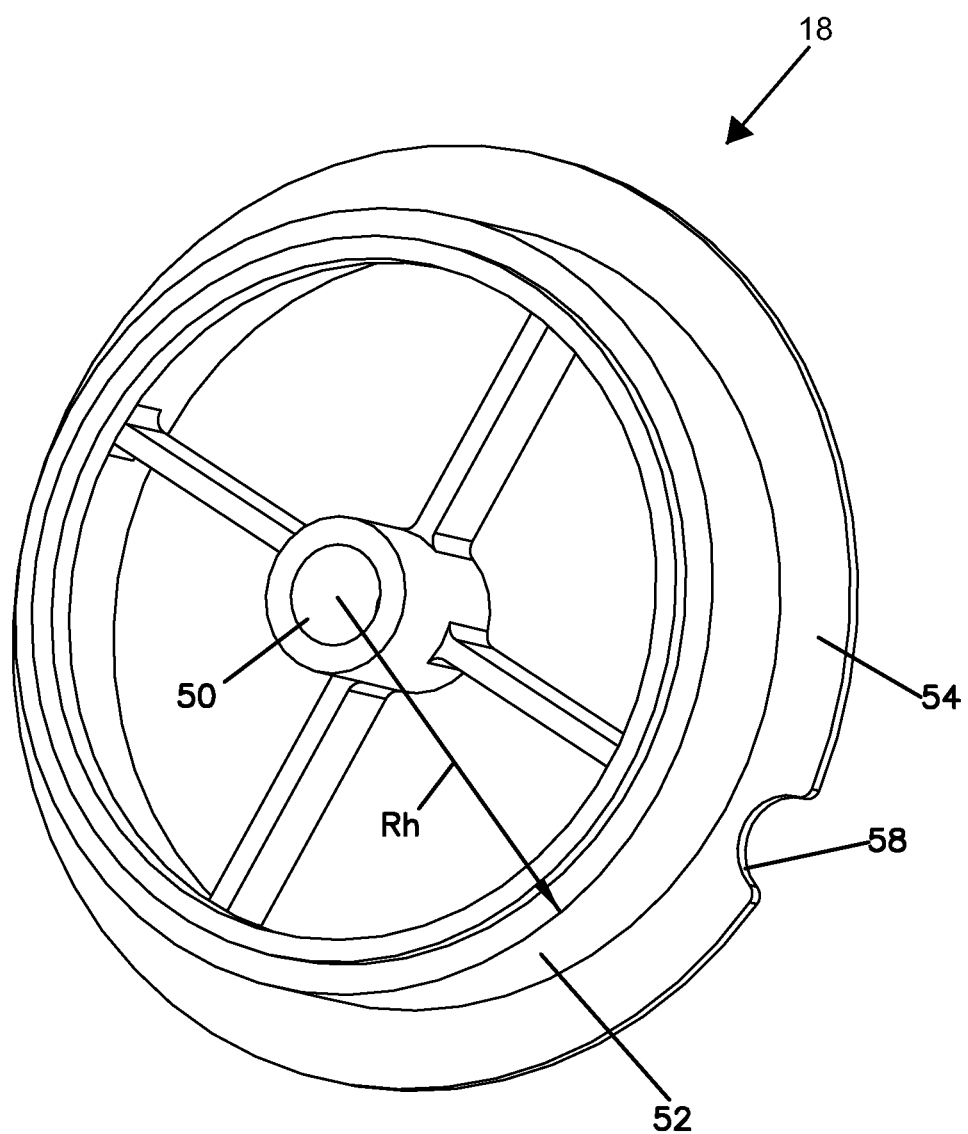
FIG. 13 is a perspective view of a hub of the spool of FIG. 1.
Figure 14:
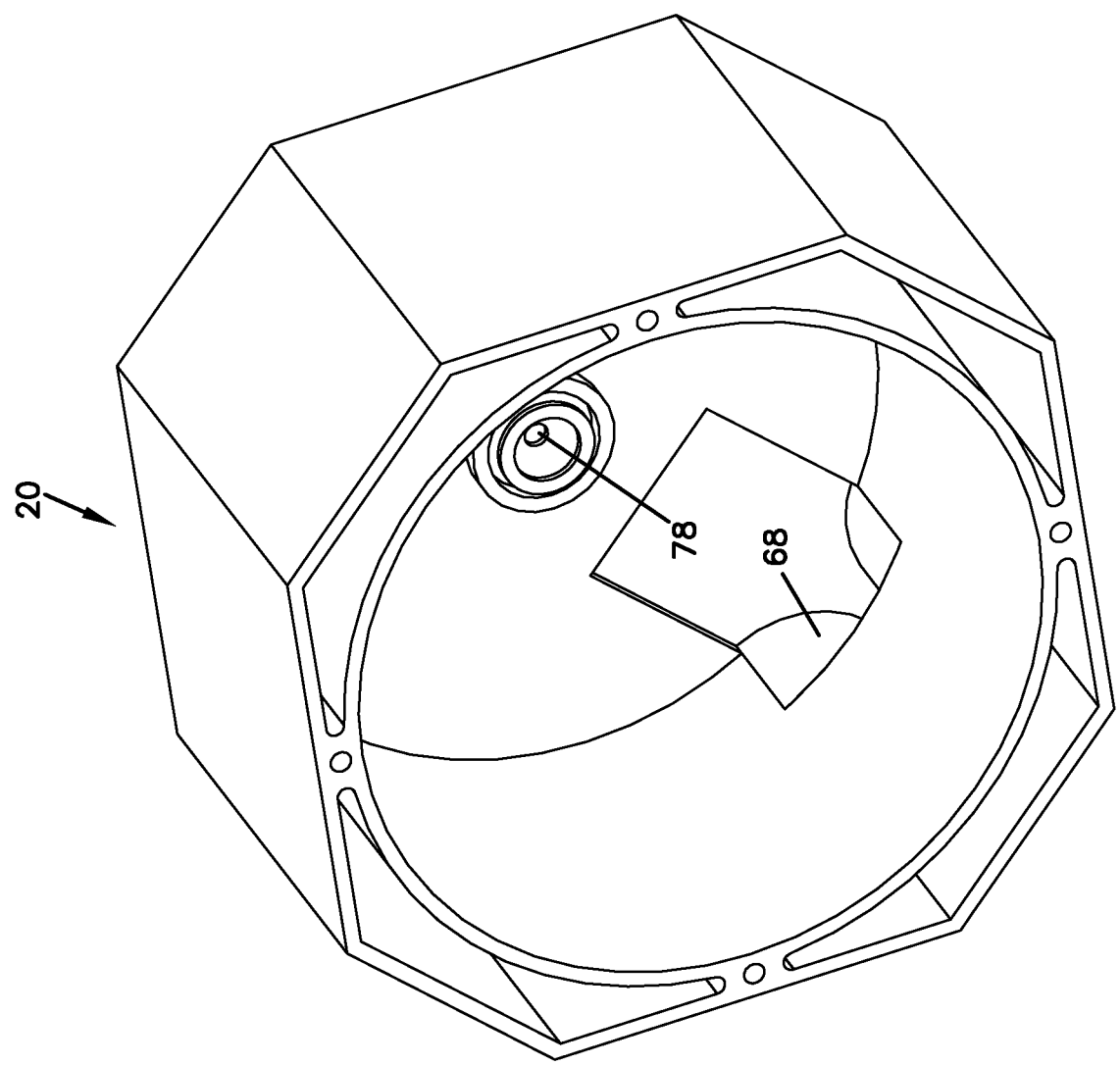
FIG. 14 is a perspective view of a cover of the spool of FIG. 1.
Figure 15:
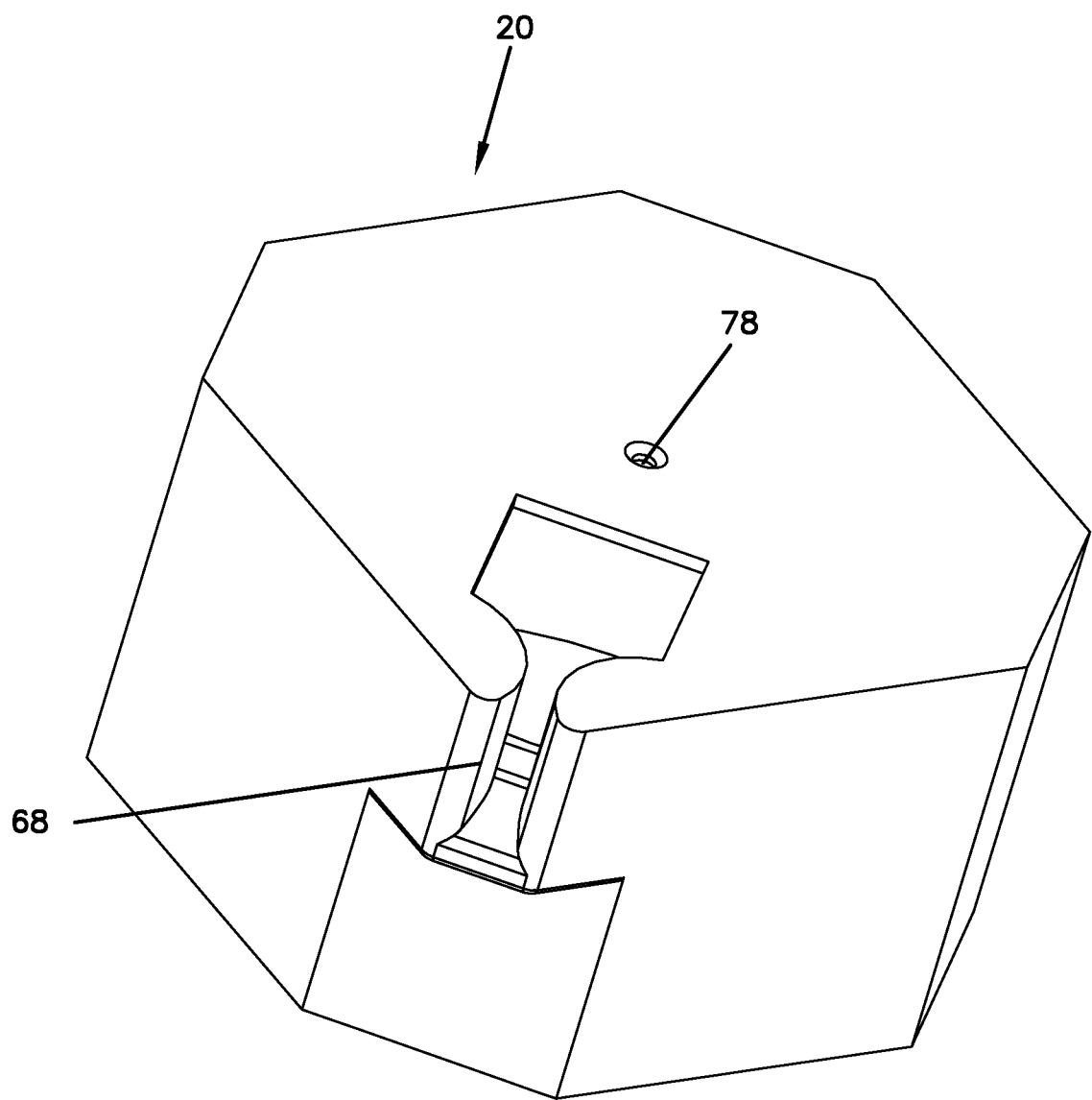
FIG. 15 is another perspective view of the cover of FIG. 14.

As depicted, the base 14 rotatably mounts the hub 18 about the axis A1. The hub 18 can include bearings 50 (see FIG. 13) adapted to mount on the axle 24 of the base 14. The hub 18 includes a cable wrapping area 52 that can define a radius Rh. In applications where the telecommunications cable 12 is the fiber optic cable 40, the radius Rh can be greater than the minimum bend radius Rmin. The hub 18 can include a flange 54 adjacent the cable wrapping area 52. The flange 54 can include a passage 58. The flange 54 can serve to keep the telecommunications cable 12 from slipping off of the hub 18. The passage 58 through the flange 54 can provide a route for the telecommunications cable 12 while the spool 10 is being assembled (see FIG. 3).

In the depicted embodiment, the radii Rb, Rr, and Rh are substantially equal to each other. In addition, the cable wrapping areas 36 and 52 and the cylindrical surface 82, 82' are substantially aligned and coaxial with each other. The spool 10 with the cable wrap reverser 16 forms coils of the telecommunications cable 12 that are coaxially arranged, but are wound in opposite directions. The coils or portions of the coils can approximate a helix with one coil being a right hand helix and the other coil being a left hand helix.

Figure 5:
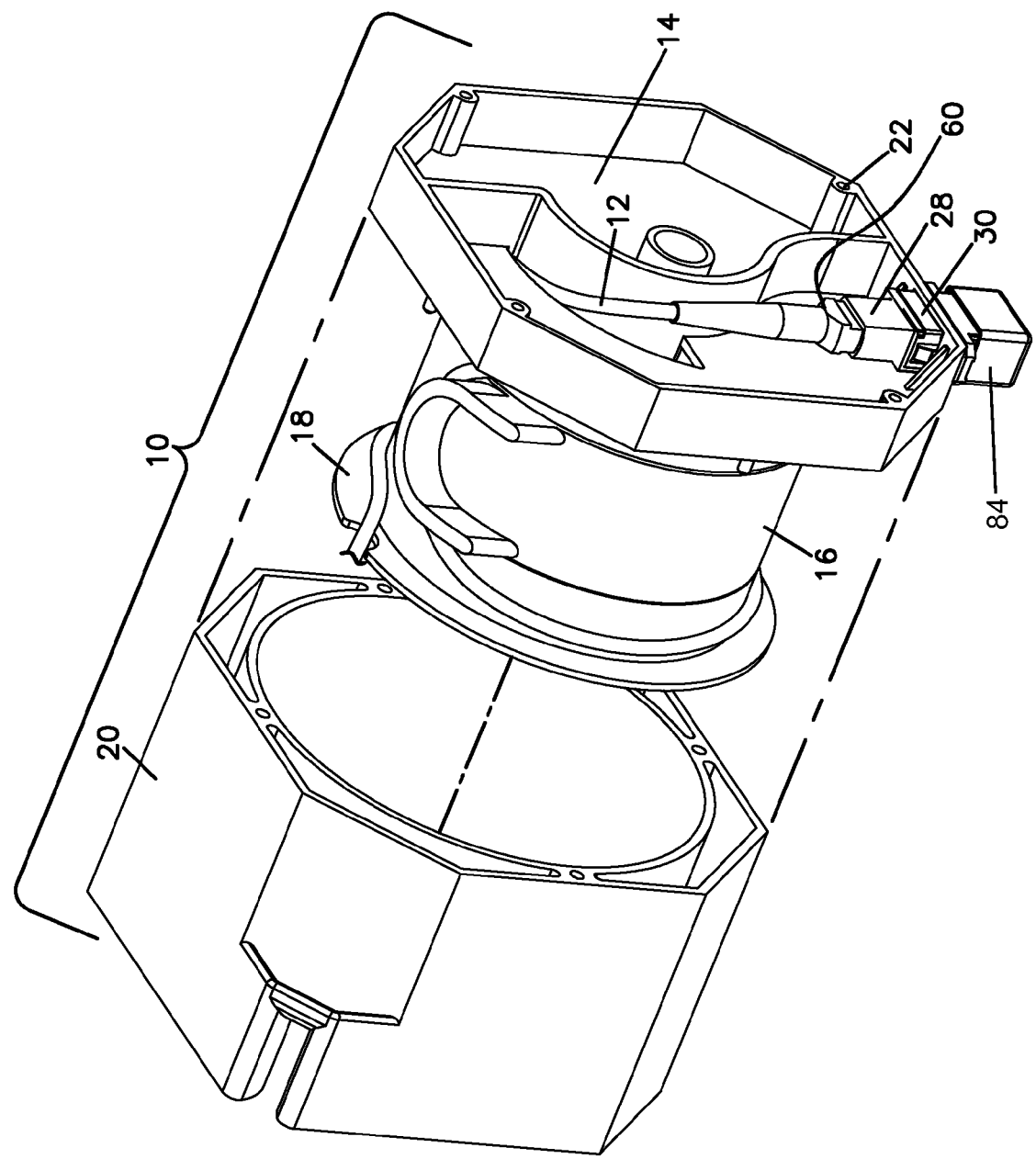
FIG. 5 is another perspective view of the spool of FIG. 1 with the access cover of FIG. 2 removed and the spool cover of FIG. 3 separated from the spool.
Figure 6:
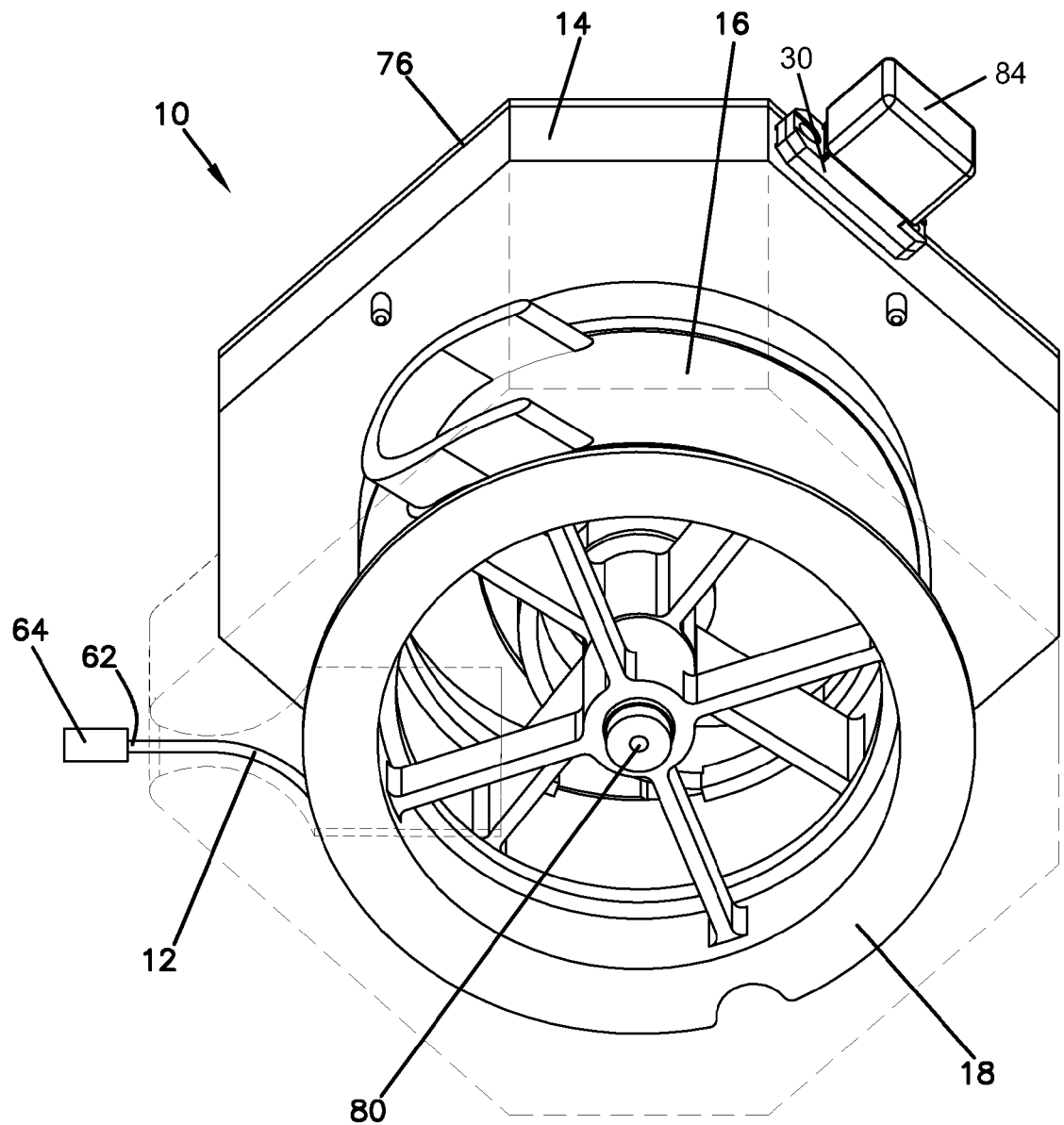
FIG. 6 is another perspective view of the spool of FIG. 1 with the spool cover of FIG. 3 shown transparently in phantom line and a telecommunications cable shown in a retracted configuration.
Figure 7:
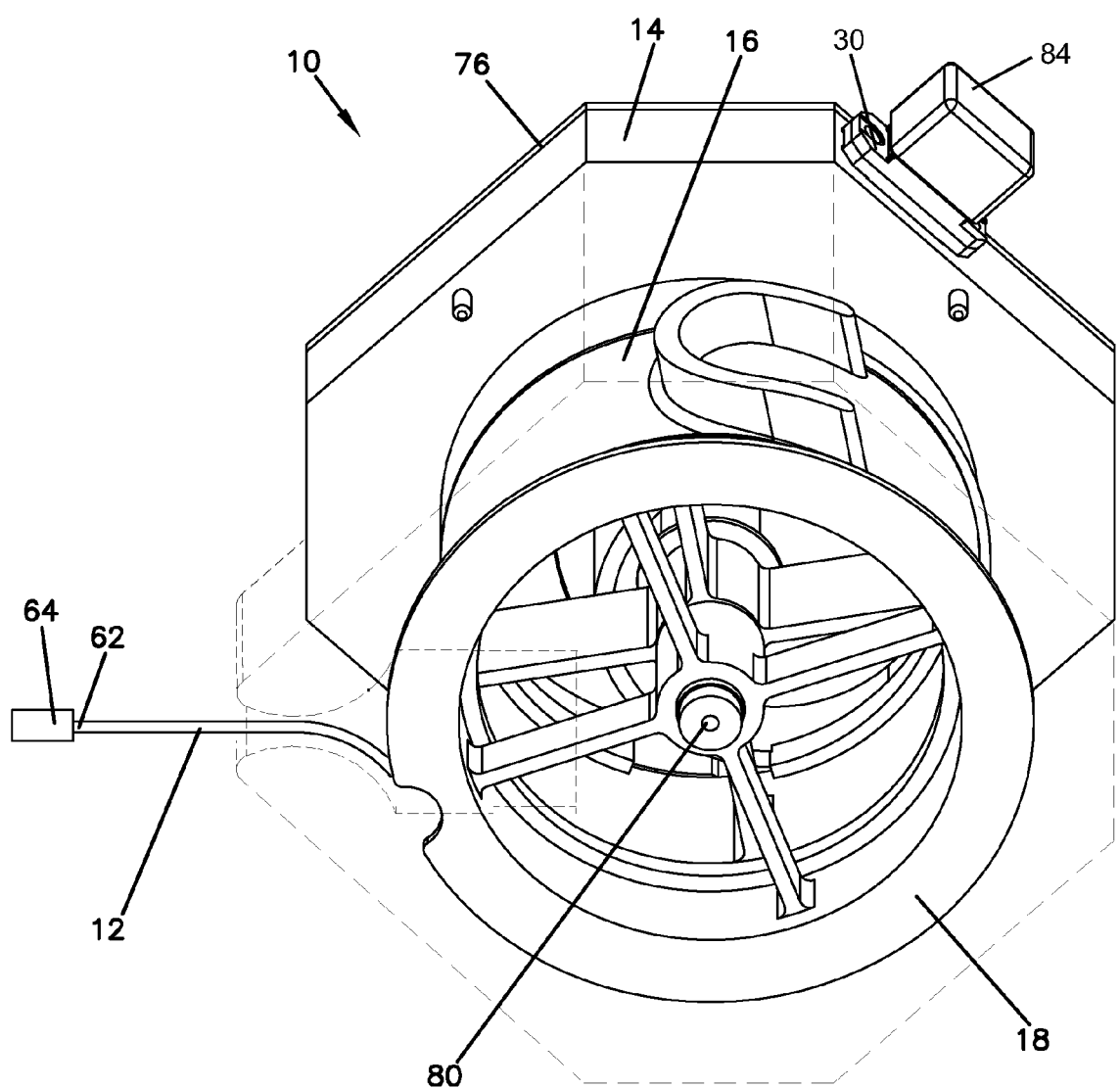
FIG. 7 is the perspective view of FIG. 6 showing the spool of FIG. 1 with the spool cover of FIG. 3 shown transparently in phantom line and the telecommunications cable of FIG. 6 shown slightly extended.
Figure 8:
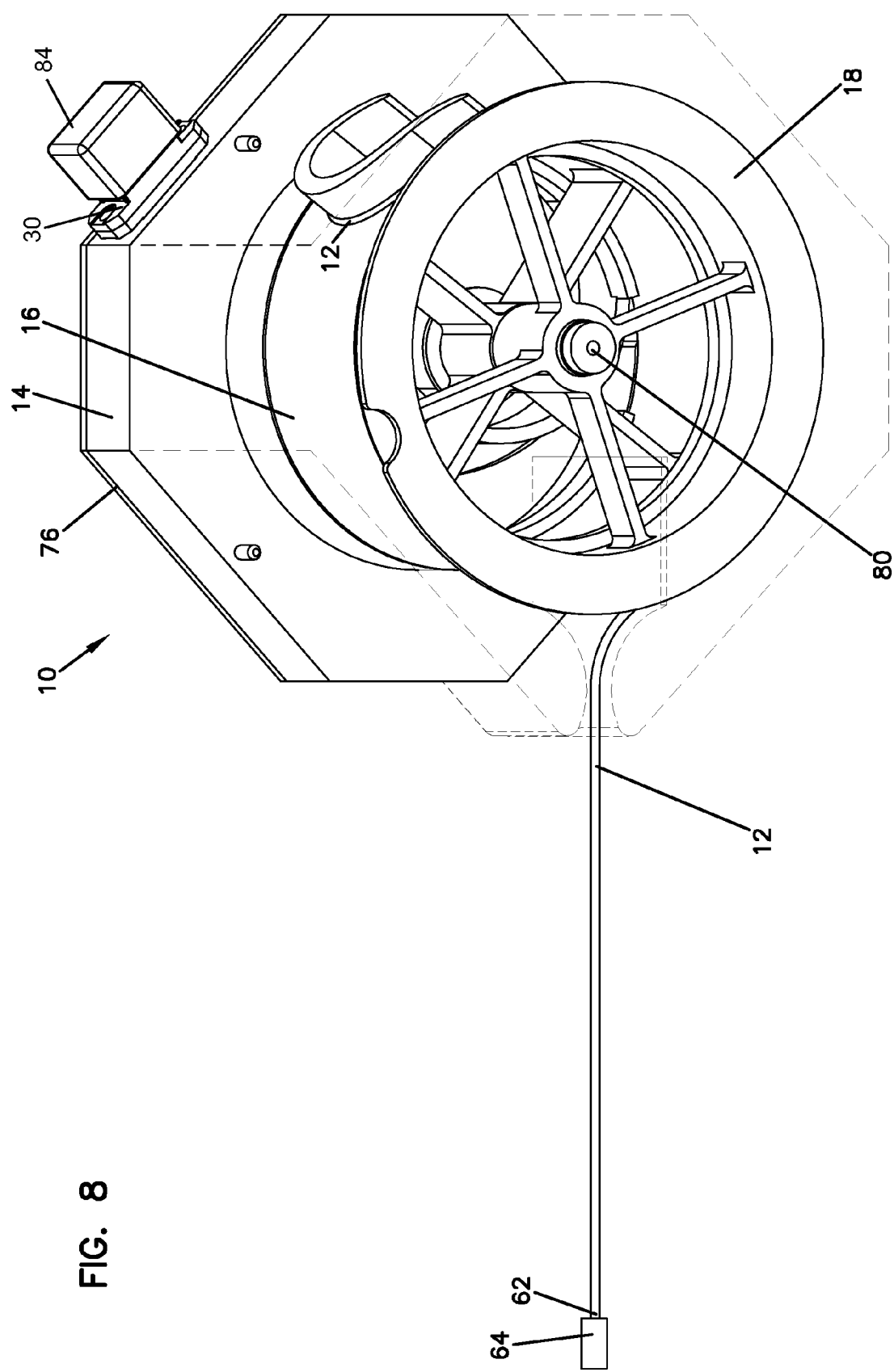
FIG. 8 is the perspective view of FIG. 6 showing the spool of FIG. 1 with the spool cover of FIG. 3 shown transparently in phantom line and the telecommunications cable of FIG. 6 shown increasingly extended.

The base 14 of the spool 10 can hold a first end 60 of the telecommunications cable 12 (see FIG. 5). Alternatively, the first end 60 of the telecommunications cable 12 can be free of the base 14, and the telecommunications cable 12 can pass through the base 14. A second end 62 of the telecommunications cable 12 can be extended from the spool 10 as shown at FIGS. 6-8. The second end 62 of the telecommunications cable 12 can be terminated by a connector 64. The second end 62 of the telecommunications cable 12 can be extended (i.e., paid out) from the spool 10 by pulling on the second end 62 in a direction away from the spool 10.

Figure 3:
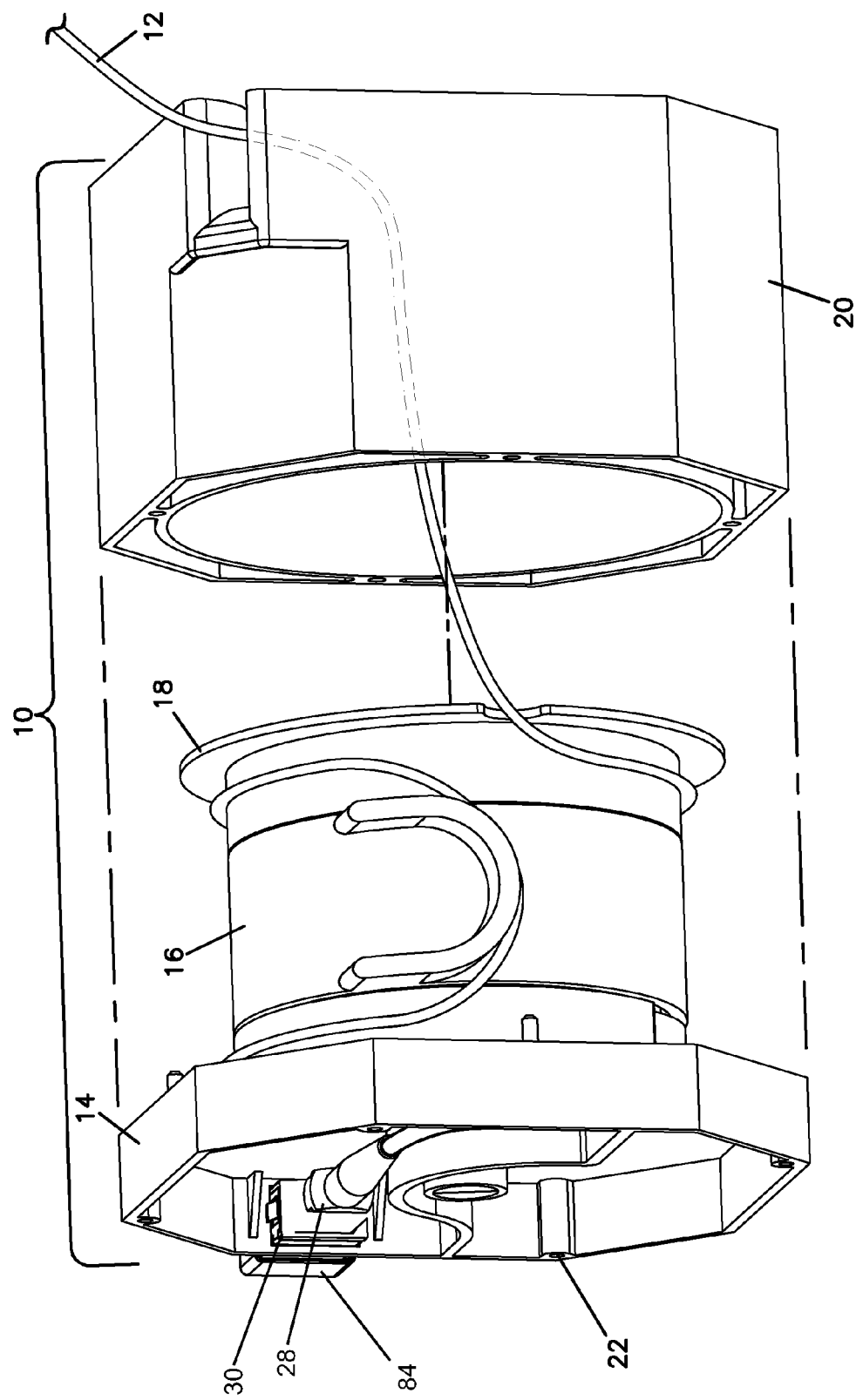
FIG. 3 is another perspective view of the spool of FIG. 1 with the access cover of FIG. 2 removed and a spool cover separated from the spool.
Figure 4:
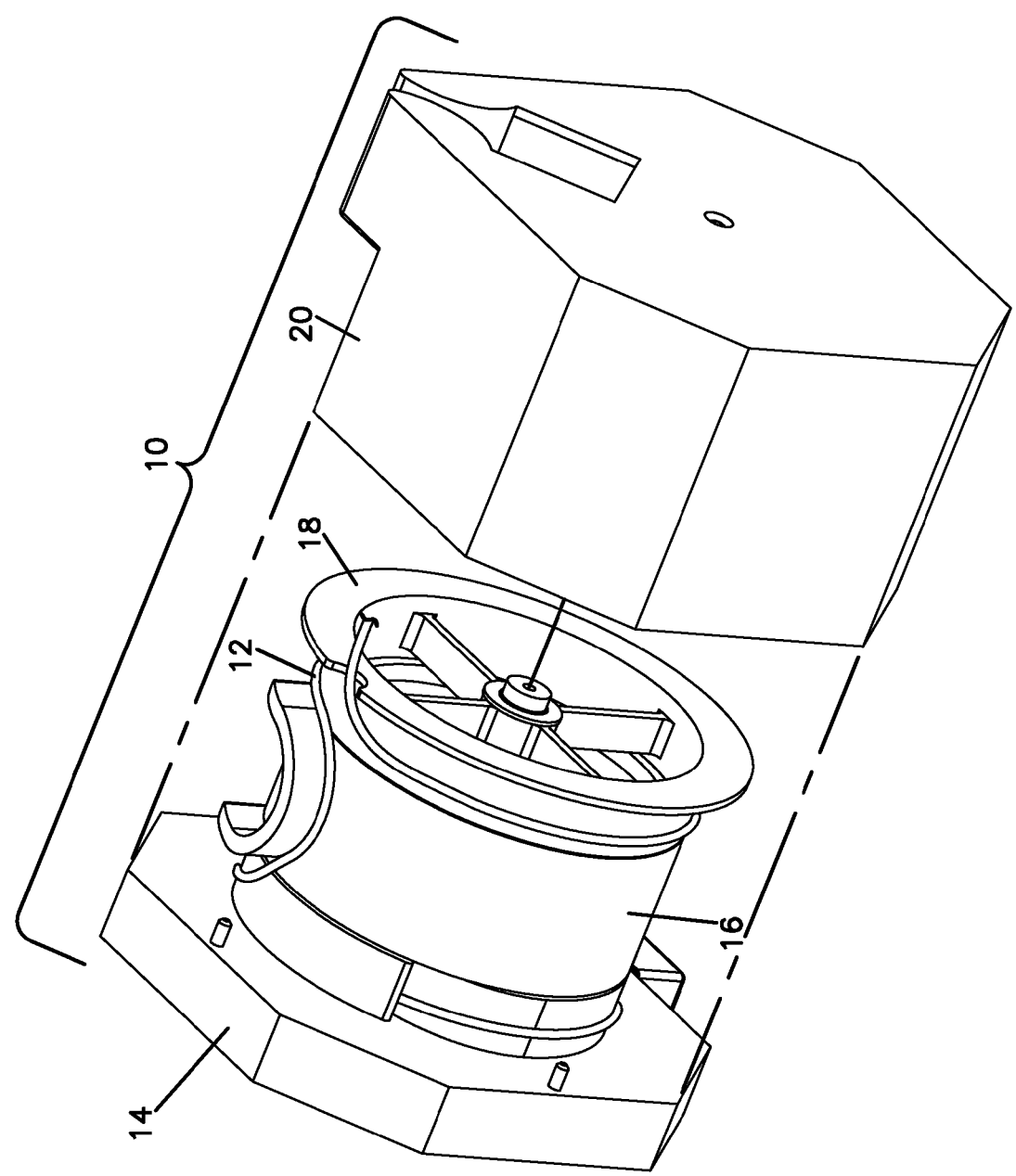
FIG. 4 is another perspective view of the spool of FIG. 1 with the access cover of FIG. 2 removed and the spool cover of FIG. 3 separated from the spool.

The spool 10 is adapted to wrap the telecommunications cable 12 adjacent the first end 60 about the cable wrapping area 36 of the base 14 in a first wrapping direction (e.g., FIGS. 3 and 4 show the telecommunications cable 12 wrapped in a right hand direction about the cable wrapping area 36) and is adapted to wrap the telecommunication cable about the cable wrapping area 52 of the hub 18 in a second wrapping direction, (e.g., FIGS. 3 and 4 show the telecommunications cable 12 wrapped in a left hand direction about the cable wrapping area 52). The cable wrap reverser 16 is adapted to transition and guide the telecommunications cable 12 from wrapping in the first wrapping direction on the cable wrapping area 36 to wrapping in the second wrapping direction on the cable wrapping area 52. The first and the second wrapping directions are generally centered on the rotation axis A1 (e.g., the wrapping directions can approximately form a helix that is centered on the rotation axis A1).

Figure 19:
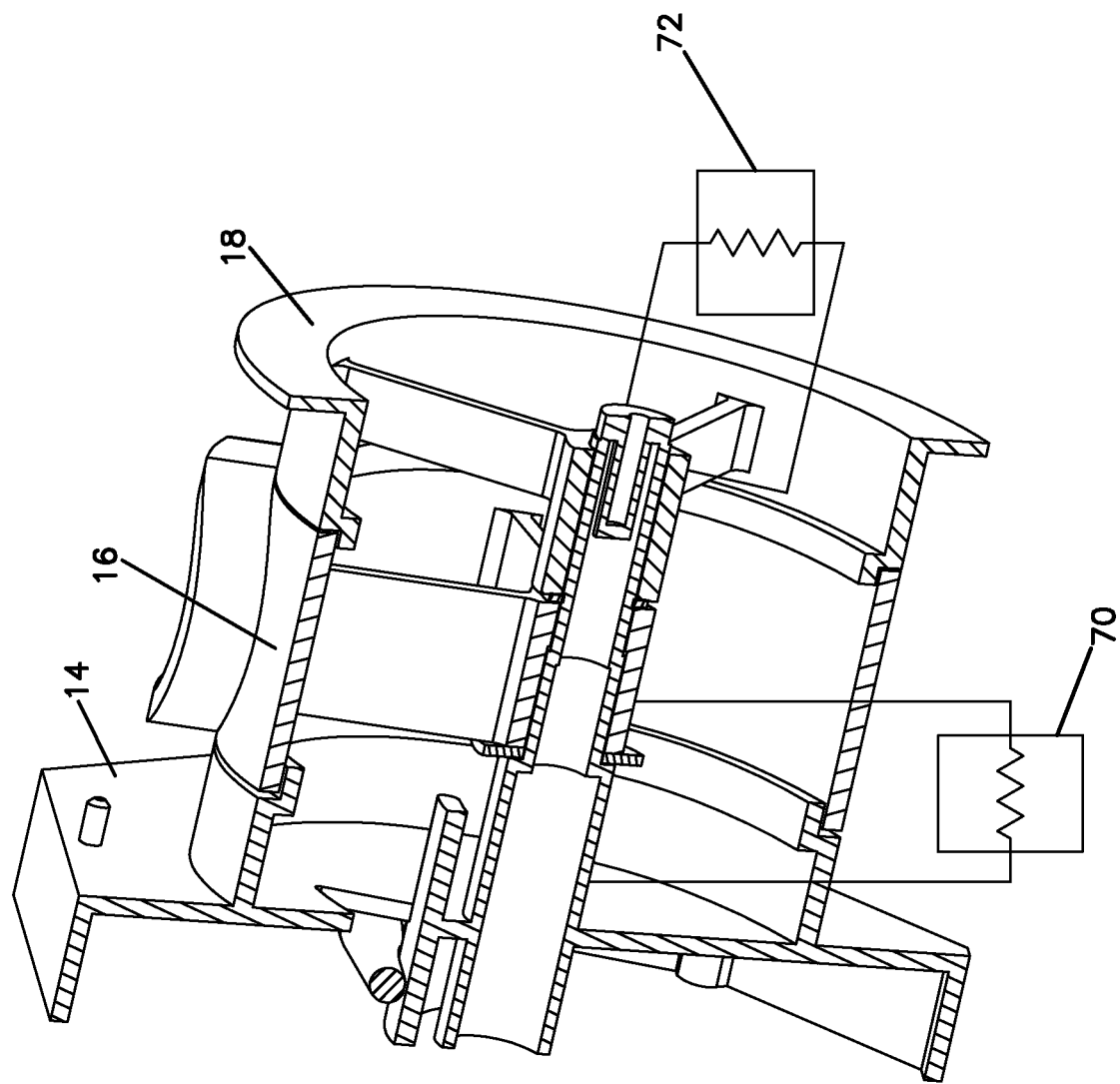
FIG. 19 is a schematic view of a spring between the base of FIG. 9 and the cable wrap reverser of FIG. 12 and another spring between the base of FIG. 9 and the hub of FIG. 13.

The cover 20 can include a cable exit 68. The cable exit 68 can be positioned as desired by mounting the cover 20 on the base 14 at a corresponding orientation. The cover 20 can be secured to the base 14 by fastening a fastener opening 78 on the cover 20 to a fastener opening 80 on the base 14. In the depicted embodiment, the fastener opening 80 is located at an end of the axle 24 of the base 14 and can be a threaded fastener opening concentric with the axis A1. When the spool 10 is assembled, the cable exit 68 can be positioned to tangentially guide the telecommunications cable 12 off and on the cable wrapping area 52 of the hub 18 when the second end 62 of the telecommunications cable 12 is pulled away from the spool 10. The spool 10 can include a torsion spring 70 connected between the cable wrap reverser 16 and the base 14 (see FIG. 19). The spool 10 can include a torsion spring 72 connected between the hub 18 and the base 14 (see FIG. 19). The torsion spring 70 urges the cable wrap reverser 16 to rotate about the rotation axis A1 when the torsion spring 70 is wound. The cable guide 46 of the cable wrap reverser 16 is adapted to wrap the telecommunications cable 12 in the first wrapping direction about the cable wrapping area 36 when the cable wrap reverser 16 is rotated by the torsion spring 70. The cable wrapping area 52 of the hub 18 is adapted to feed the telecommunications cable 12 from the cable wrapping area 52 to the cable guide 46 of the cable wrap reverser 16 when the cable wrap reverser 16 is rotated by the torsion spring 70. The cable wrapping area 52 is adapted to wrap the telecommunications cable 12 adjacent the second end 62 when the cable wrap reverser 16 is rotated by the torsional spring 70.

Figure 20:
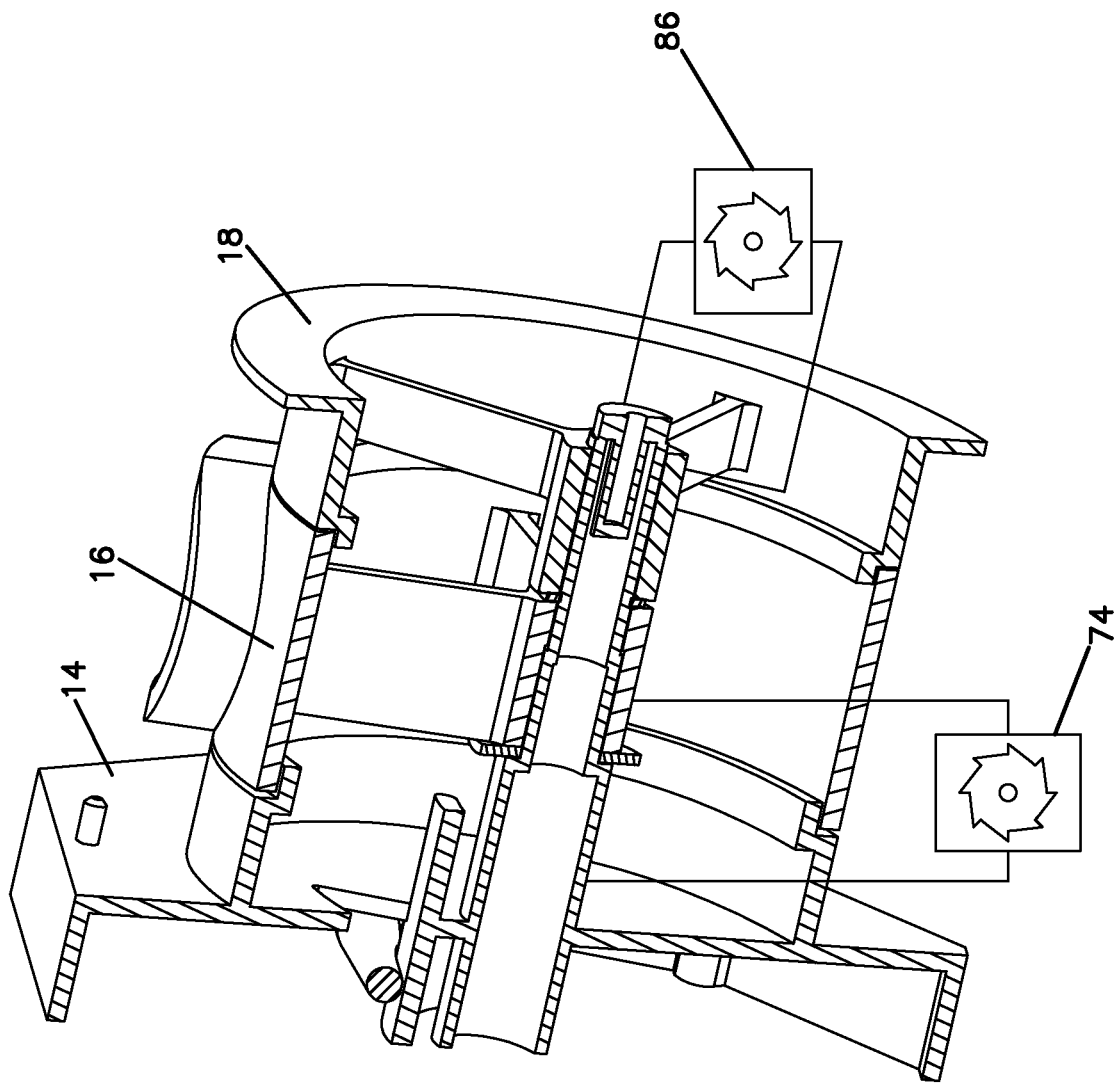
FIG. 20 is a schematic view of a ratchet between the base of FIG. 9 and the cable wrap reverser of FIG. 12 and another ratchet between the base of FIG. 9 and the hub of FIG. 13.

The spool 10 can include a ratchet 74 connected between the cable wrap reverser 16 and the base 14 (see FIG. 20). The ratchet 74 is adapted to allow the telecommunications cable 12 to be paid-out from the spool 10 and hold the torsional spring 70, 72 from urging the cable wrap reverser 16 from rotating about the rotation axis A1 when the torsional spring 70, 72 is wound. The ratchet 74 can be releasable by various methods known in the art.

The spool 10 can include a ratchet 86 connected between the hub 18 and the base 14 (see FIG. 20). The ratchet 86 is adapted to allow the telecommunications cable 12 to be paid-out from the spool 10 and hold the torsional spring 70, 72 from urging the hub 18 from rotating about the rotation axis A1 when the torsional spring 70, 72 is wound. The ratchet 86 can be releasable by various methods known in the art.

Certain hubs of certain spools and cable wrapping areas of certain spools can be non-cylindrical (e.g., hexagonal, square, rectangular, etc.).

The principles of the present disclosure also include a method of wrapping the telecommunications cable 12 about the spool 10. The method includes: wrapping the telecommunications cable 12 about the cable wrapping area 36 of the base 14 of the spool 10 in a first wrapping direction, wrapping the telecommunications cable 12 about the cable wrapping area 52 of the hub 18 of the spool 10 in a second opposite wrapping direction, transitioning the telecommunications cable 12 with the cable guide 46 of the cable wrap reverser 16 from the first wrapping direction on the cable wrapping area 36 to the second wrapping direction on the cable wrapping area 52, and rotating the cable wrap reverser 16 and thereby unwrapping a portion of the telecommunications cable 12 from the cable wrapping area 52, transitioning the unwrapped portion of the telecommunications cable 12 with the cable guide 46 of the cable wrap reverser 16, and wrapping the transitioned portion of the telecommunications cable 12 about the cable wrapping area 36 of the base 14 of the spool 19 in the first wrapping direction.

The wrapping method can also include wrapping additional telecommunications cable 12 about the cable wrapping area 52 of the hub 18 of the spool 10 as the rotating cable wrap reverser 16 unwraps the portion of the telecommunications cable 12 from the cable wrapping area 52. The wrapping method can further include the additional telecommunications cable 12 being wrapped about the cable wrapping area 52 of the hub 18 of the spool 10 at a wrapping rate about double an unwrapping rate of the portion of the telecommunications cable 12 being unwrapped from the cable wrapping area 52 of the hub 18 of the spool 10 by the rotating cable wrap reverser 16.

The principles of the present disclosure also include a method of unwrapping the telecommunications cable 12 from the spool 10. The method includes: unwrapping the telecommunications cable 12 from the cable wrapping area 36 of the base 14 of the spool 10 in a first unwrapping direction, unwrapping the telecommunications cable 12 from the cable wrapping area 52 of the hub 18 of the spool 10 in an opposite second unwrapping direction, transitioning the telecommunications cable 12 with the cable guide 46 of the cable wrap reverser 16 from a first wrap direction on the cable wrapping area 36 to an opposite second wrap direction on the cable wrapping area 52, rotating the cable wrap reverser 16 and thereby unwrapping a portion of the telecommunications cable 12 from the cable wrapping area 36, transitioning the unwrapped portion of the telecommunications cable 12 with the cable guide 46 of the cable wrap reverser 16, and wrapping the transitioned portion of the telecommunications cable 12 about the cable wrapping area 52 of the hub 18 of the spool 10 in the second wrap direction.

The unwrapping method can also include unwrapping additional telecommunications cable 12 from the cable wrapping area 52 of the hub 18 of the spool 10 as the rotating cable wrap reverser 16 wraps the portion of the telecommunications cable 12 on the cable wrapping area 52. The unwrapping method can further include the additional telecommunications cable 12 being unwrapped from the cable wrapping area 52 of the hub 18 of the spool 10 at an unwrapping rate about double a wrapping rate of the portion of the telecommunications cable 12 being wrapped on the cable wrapping area 52 of the hub 18 of the spool 10 by the rotating cable wrap reverser 16.

Figure 21:
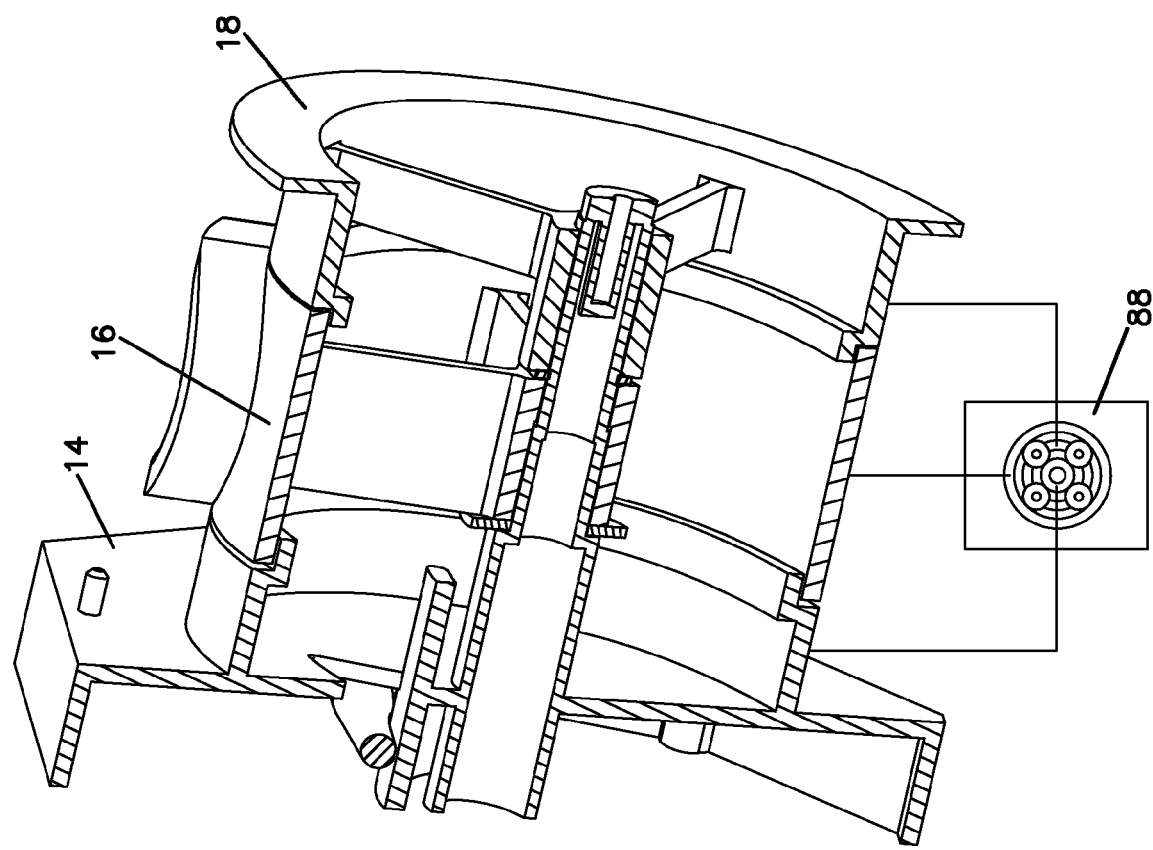
FIG. 21 is a schematic view of the spool of FIG. 1 including a gear set.

The spool 10 can be powered by the pulling of the telecommunications cable 12, the spring 70, 72 of the spool, a hand crank, a motor, and various other means. The base 14, the cable wrap reverser 16, and/or the hub 18 of the spool 10 can be geared to one another by a gear set 88 (see FIG. 21). The gear set 88 can cause the hub 18 to turn twice as fast as the cable wrap reverser 16. The telecommunications cable 12, in combination with its above described routing, can serve to gear the base 14, the cable wrap reverser 16, and/or the hub 18 of the spool 10 to one another. The telecommunications cable 12 can cause the hub 18 to turn twice as fast as the cable wrap reverser 16. The hub 18 and the cable wrap reverser 16 typically turn in the same direction.

The telecommunications cable 12 is wound/unwound without causing twists in the telecommunications cable 12, even though one end of the telecommunications cable 12 remains stationary.

Figure 17:
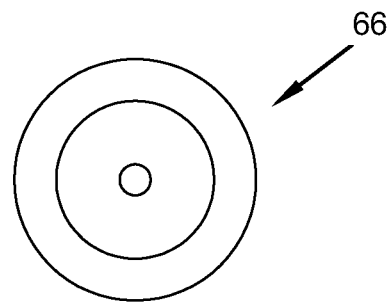
FIG. 17 is a cross sectional view of an electrical telecommunications cable.
Figure 23:
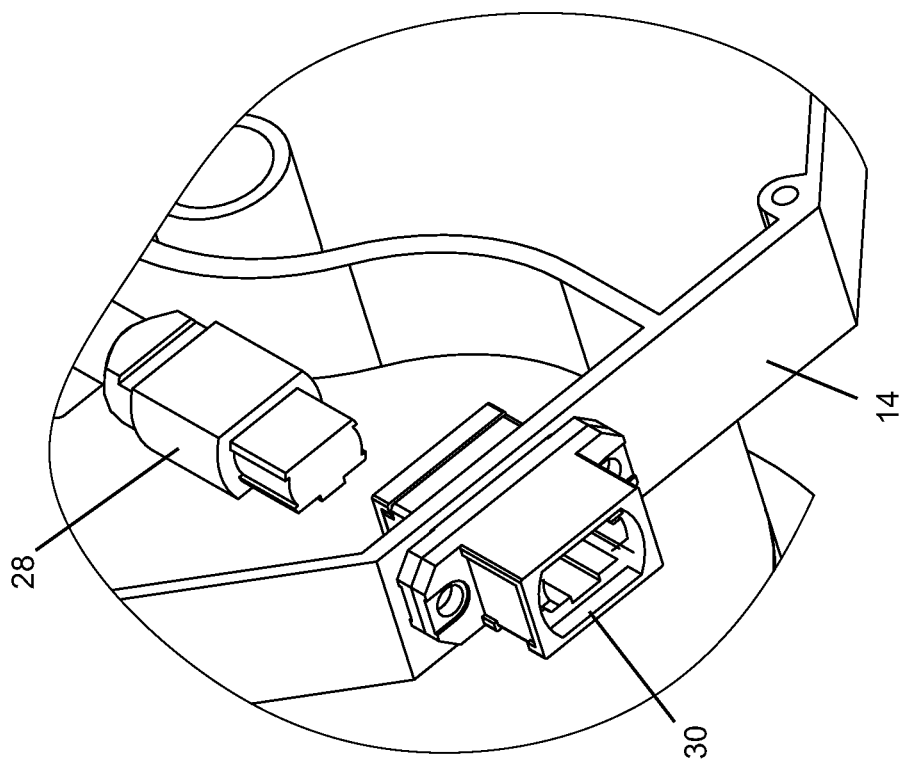
FIG. 23 is the partial perspective view of FIG. 22 but with the connector disconnected from the adapter.
Figure 22:
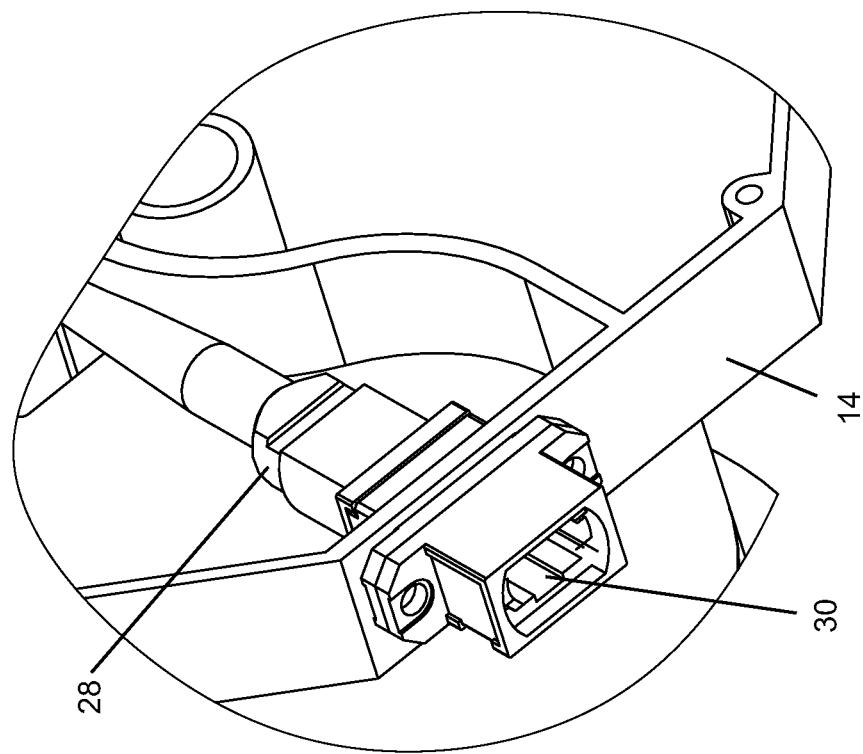
FIG. 22 is a partial perspective view illustrating an adapter and a connector, the connector terminating the telecommunications cable of FIG. 6.

The telecommunications cable 12 can be the fiber optic cable 40 (see FIG. 16), an electrical cable 66 (see FIG. 17), or other cables such as a hybrid fiber optic/electrical cable. In the depicted embodiment, the telecommunications cable 12 is a multi-fiber fiber optic telecommunications cable and the connector 28 is a multi-fiber fiber optic connector. In other embodiments, the telecommunications cable 12 can be a single-fiber fiber optic telecommunications cable and the connector 28 can be a single-fiber fiber optic connector. The connector 28 terminates the telecommunications cable 12 and can be connected with the adapter 30 (See FIGS. 22 and 23).

From the forgoing detailed description, it will be evident that modifications and variations can be made without departing from the spirit and scope of the disclosure.

What is claimed is:

1. A spool for a telecommunications cable, the spool comprising:
   a base including a spool mount and a first cable wrapping area, the base defining a rotation axis;
   a cable wrap reverser including a cable guide, the cable wrap reverser rotatably mounted about the rotation axis of the base; and
   a hub including a second cable wrapping area, the hub rotatably mounted about the rotation axis of the base;
   wherein the base of the spool is adapted to hold a first end of the telecommunications cable;
   wherein the spool is adapted to wrap the telecommunications cable adjacent the first end about the first cable wrapping area of the base in a first wrapping direction and is adapted to wrap the telecommunications cable about the second cable wrapping area of the hub in a second wrapping direction, the first and the second wrapping directions being generally opposite from each other and the second cable wrapping area being rotatable with respect to the first cable wrapping area;
   wherein the cable wrap reverser is adapted to transition the telecommunications cable from wrapping in the first wrapping direction on the first cable wrapping area to wrapping in the second wrapping direction on the second cable wrapping area; and wherein the spool is adapted to pay-out the telecommunications cable when a second end of the telecommunications cable adjacent the second cable wrapping area is pulled away from the spool.

2. The spool of claim 1, wherein the base includes an axle that defines the rotation axis and the first wrapping direction is generally centered on the rotation axis.

3. The spool of claim 2, wherein the cable wrap reverser is rotatably mounted on the axle of the base.

4. The spool of claim 2, wherein the hub is rotatably mounted on the axle of the base and the second wrapping direction is generally centered on the rotation axis.

5. The spool of claim 1, wherein the cable wrap reverser is positioned between the base and the hub.

6. The spool of claim 1, wherein the telecommunications cable includes an optical fiber.

7. The spool of claim 1, wherein the telecommunications cable includes an electrical conductor.

8. The spool of claim 1, further comprising a cover including a cable exit, the cover mounted to the base and the cable exit adapted to tangentially guide the telecommunications cable off of the second cable wrapping area of the hub when the second end of the telecommunications cable is pulled away from the spool.

9. The spool of claim 1, wherein the cable guide of the cable wrap reverser is a pulley.

10. The spool of claim 1, further comprising a torsional spring connected between the cable wrap reverser and the base, the torsional spring urging the cable wrap reverser to rotate about the rotation axis when the torsional spring is wound, wherein the cable guide of the cable wrap reverser is adapted to wrap the telecommunications cable in the first wrapping direction about the first cable wrapping area when the cable wrap reverser is rotated by the torsional spring.

11. The spool of claim 10, wherein the second cable wrapping area of the hub is adapted to feed the telecommunications cable from the second cable wrapping area to the cable guide of the cable wrap reverser when the cable wrap reverser is rotated by the torsional spring and wherein the second cable wrapping area is adapted to wrap the telecommunications cable adjacent the second end when the cable wrap reverser is rotated by the torsional spring.

12. The spool of claim 10, further comprising a ratchet connected between the cable wrap reverser and the base, wherein the ratchet is adapted to allow the telecommunications cable to be paid-out from the spool and wherein the ratchet is adapted to hold the torsional spring from urging the cable wrap reverser to rotate about the rotation axis when the torsional spring is wound.

13. The spool of claim 12, wherein the ratchet is selectively releasable.

14. A spool for a telecommunications cable, the spool comprising:
a base including a spool mount and a first cable wrapping area, the first cable wrapping area being generally cylindrical and defining a first radius and a rotation axis;
a cable wrap reverser including a first cable guide, the cable wrap reverser rotatably mounted about the rotation axis of the base, the first cable guide including a generally radial portion defining a second radius, and the generally radial portion positioned generally tangent to a portion of the first cable wrapping area; and
a hub including a second cable wrapping area, the hub rotatably mounted about the rotation axis of the base, the second cable wrapping area being generally cylindrical and defining a third radius, a portion of the second cable wrapping area positioned generally tangent to the generally radial portion of the first cable guide, and the second cable wrapping area being rotatable with respect to the first cable wrapping area.

15. The spool of claim 14, wherein the base includes an axle aligned with the rotation axis, the cable wrap reverser being rotatably mounted on the axle of the base, and the hub being rotatably mounted on the axle of the base with the second cable wrapping area of the hub generally centered on the rotation axis.

16. The spool of claim 14, wherein the first, the second, and the third radii are each greater than a minimum bend radius of an optical fiber of the telecommunications cable.

17. The spool of claim 14, further comprising a cover including a cable exit, the cover mounted to the base, the cable exit including a second cable guide, the second cable guide defining a fourth radius greater than a minimum bend radius of an optical fiber of the telecommunications cable, and the second cable guide positioned generally tangent to the second cable wrapping area of the hub.

18. The spool of claim 14, wherein the first cable guide of the cable wrap reverser is a pulley.

19. The spool of claim 14, wherein the first cable guide defines a guide axis, the guide axis being generally perpendicular to the rotation axis.

20. The spool of claim 14, further comprising a torsional spring connected between the cable wrap reverser and the base, the torsional spring urging the cable wrap reverser to rotate about the rotation axis when the torsional spring is wound.

21. The spool of claim 20, further comprising a ratchet connected between the cable wrap reverser and the base, wherein the ratchet is adapted to hold the torsional spring from urging the cable wrap reverser to rotate about the rotation axis when the torsional spring is wound.

22. The spool of claim 21, wherein the ratchet is selectively releasable.

23. A method of wrapping a telecommunications cable about a spool, the method comprising:
wrapping the telecommunications cable about a first cable wrapping area of a base of the spool in a first wrapping direction, wherein the base further includes a spool mount and wherein the first cable wrapping area is generally cylindrical and defines a first radius and a rotation axis;
wrapping the telecommunications cable about a second cable wrapping area of a hub of the spool in a second wrapping direction, the second wrapping direction being substantially opposite the first wrapping direction, wherein the hub is rotatably mounted about the rotation axis, wherein the second cable wrapping area is rotatable with respect to the first cable wrapping area, and wherein the second cable wrapping area is generally cylindrical and defines a second radius;
transitioning the telecommunications cable with a cable guide of a cable wrap reverser from the first wrapping direction on the first cable wrapping area to the second wrapping direction on the second cable wrapping area, wherein the first cable guide includes a generally radial portion that defines a third radius, wherein the generally radial portion is positioned generally tangent to a portion of the first cable wrapping area, wherein the cable wrap reverser is rotatably mounted about the rotation axis, and wherein a portion of the second cable wrapping area is positioned generally tangent to the generally radial portion of the first cable guide; and
rotating the cable wrap reverser and thereby unwrapping a portion of the telecommunications cable from the second cable wrapping area, transitioning the unwrapped portion of the telecommunications cable with the cable guide of the cable wrap reverser, and wrapping the transitioned portion of the telecommunications cable about the first cable wrapping area of the base of the spool in the first wrapping direction.

24. The method of claim 23, further comprising wrapping additional telecommunications cable about the second cable wrapping area of the hub of the spool as the rotating cable wrap reverser unwraps the portion of the telecommunications cable from the second cable wrapping area.

25. The method of claim 24, wherein the additional telecommunications cable being wrapped about the second cable wrapping area of the hub of the spool is wrapped at a wrapping rate about double an unwrapping rate of the portion of the telecommunications cable being unwrapped from the second cable wrapping area of the hub of the spool by the rotating cable wrap reverser.

26. A method of unwrapping a telecommunications cable about a spool, the method comprising:
   unwrapping the telecommunications cable from a first cable wrapping area of a base of the spool in a first unwrapping direction, wherein the base further includes a spool mount and wherein the first cable wrapping area is generally cylindrical and defines a first radius and a rotation axis;
   unwrapping the telecommunications cable from a second cable wrapping area of a hub of the spool in a second unwrapping direction, the second unwrapping direction being substantially opposite the first unwrapping direction, wherein the hub is rotatably mounted about the rotation axis, wherein the second cable wrapping area is rotatable with respect to the first cable wrapping area, and wherein the second cable wrapping area is generally cylindrical and defines a second radius;
   transitioning the telecommunications cable with a cable guide of a cable wrap reverser from a first wrap direction on the first cable wrapping area to a second wrap direction on the second cable wrapping area, the second wrap direction being substantially opposite the first wrap direction, wherein the first cable guide includes a generally radial portion that defines a third radius, wherein the generally radial portion is positioned generally tangent to a portion of the first cable wrapping area, wherein the cable wrap reverser is rotatably mounted about the rotation axis, and wherein a portion of the second cable wrapping area is positioned generally tangent to the generally radial portion of the first cable guide; and
   rotating the cable wrap reverser and thereby unwrapping a portion of the telecommunications cable from the first cable wrapping area, transitioning the unwrapped portion of the telecommunications cable with the cable guide of the cable wrap reverser, and wrapping the transitioned portion of the telecommunications cable about the second cable wrapping area of the hub of the spool in the second wrap direction.

27. The method of claim 26, further comprising unwrapping additional telecommunications cable from the second cable wrapping area of the hub of the spool as the rotating cable wrap reverser wraps the portion of the telecommunications cable on the second cable wrapping area.

28. The method of claim 27, wherein the additional telecommunications cable being unwrapped from the second cable wrapping area of the hub of the spool is unwrapped at an unwrapping rate about double a wrapping rate of the portion of the telecommunications cable being wrapped on the second cable wrapping area of the hub of the spool by the rotating cable wrap reverser.

29. A spool for a telecommunications cable, the spool comprising:
   a first cable wrapping member defining a rotation axis;
   a cable wrap reverser rotatably mounted about the rotation axis of the first cable wrapping member and including a first portion positioned generally tangent to a cable wrapping portion of the first cable wrapping member; and
   a second cable wrapping member rotatably mounted about the rotation axis of the first cable wrapping member, the second cable wrapping member including a cable wrapping portion positioned generally tangent to a second portion of the cable wrap reverser, and the second cable wrapping member rotatable with respect to the first cable wrapping member;
   wherein the first and second portions of the cable wrap reverser always rotate together when the cable wrap reverser is rotated about the rotation axis of the first cable wrapping member.

30. The spool of claim 29, wherein the cable wrap reverser defines an axis generally perpendicular to the rotation axis of the first cable wrapping member.

* * * * *